(12) United States Patent
Okada et al.

(10) Patent No.: US 8,865,349 B2
(45) Date of Patent: Oct. 21, 2014

(54) METHOD OF PRODUCING POSITIVE ELECTRODE ACTIVE MATERIAL AND NONAQUEOUS ELECTROLYTE BATTERY USING THE SAME

(75) Inventors: Shigeto Okada, Fukuoka (JP); Tomoyuki Shiratsuchi, Ohnojo (JP); Tomoko Iwanaga, Fukuoka (JP); Jun-ichi Yamaki, Kasuga (JP); Shinji Iizuka, Shibukawa (JP); Osamu Omae, Shibukawa (JP); Kumiko Sueto, Shibukawa (JP); Takeshi Shimada, Shibukawa (JP)

(73) Assignees: Kanto Denka Kogyo Co., Ltd., Tokyo (JP); Kyushu University, National University Corporation, Fukuoka (JP)

(*) Notice: Subject to any disclaimer, the term of this patent is extended or adjusted under 35 U.S.C. 154(b) by 1657 days.

(21) Appl. No.: 12/067,739
(22) PCT Filed: Sep. 20, 2006
(86) PCT No.: PCT/JP2006/318610
§ 371 (c)(1),
(2), (4) Date: Jan. 7, 2009
(87) PCT Pub. No.: WO2007/034823
PCT Pub. Date: Mar. 29, 2007

(65) Prior Publication Data
US 2009/0130559 A1   May 21, 2009

(30) Foreign Application Priority Data
Sep. 21, 2005   (JP) .................... 2005-274236

(51) Int. Cl.
H01M 4/58 (2010.01)
H01M 4/50 (2010.01)
(Continued)

(52) U.S. Cl.
CPC ............ *H01M 4/5825* (2013.01); *Y02E 60/122* (2013.01); *H01M 4/625* (2013.01);
(Continued)

(58) Field of Classification Search
USPC .................................. 429/231.95, 231.1, 224
IPC .................................................. H01M 4/58,4/52
See application file for complete search history.

(56) References Cited

U.S. PATENT DOCUMENTS

2001/0055718 A1* 12/2001 Li et al. ..................... 429/221
(Continued)

FOREIGN PATENT DOCUMENTS

| CN | 1340869 A | 3/2002 |
| CN | 1478310 A | 2/2004 |

(Continued)

OTHER PUBLICATIONS

Machine translation of Kondo (JP2006-073259).*
(Continued)

*Primary Examiner* — Jun Li
(74) *Attorney, Agent, or Firm* — Browdy and Neimark, PLLC

(57) ABSTRACT

The present invention provides a positive electrode active material that has rate characteristics suitable for nonaqueous electrolyte batteries and particularly nonaqueous electrolyte secondary batteries, a method by which this positive electrode active material can be easily mass produced, and a high-performance nonaqueous electrolyte battery that has a positive electrode active material obtained by this method.
The present invention relates to a method of producing a positive electrode active material, the method comprising a step of mixing a carbon source with lithium manganese phosphate $LiMnPO_4$ or a compound $LiMn_{1-x}M_xPO_4$ (where, $0 \leq x < 1$ and M is at least one metal element selected from the group consisting of Co, Ni, Fe, Zn, Cu, Ti, Sn, Zr, V, and Al) containing lithium manganese phosphate $LiMnPO_4$ as a solid solution composition, and heat treating the obtained mixture under an inert gas atmosphere.

9 Claims, 17 Drawing Sheets

(51) Int. Cl.
*H01M 10/40* (2006.01)
*H01M 4/62* (2006.01)
*C01B 25/45* (2006.01)
*H01M 4/36* (2006.01)
*H01M 4/136* (2010.01)
*H01M 10/052* (2010.01)

(52) U.S. Cl.
CPC ............ *C01B 25/45* (2013.01); *H01M 4/366* (2013.01); *H01M 4/136* (2013.01); *H01M 10/052* (2013.01); *Y02T 10/7011* (2013.01)
USPC .................... 429/224; 429/231.3; 429/231.95

(56) References Cited

U.S. PATENT DOCUMENTS

| | | | |
|---|---|---|---|
| 2002/0047112 A1 | 4/2002 | Hosoya et al. | |
| 2003/0180616 A1 | 9/2003 | Johnson et al. | |
| 2003/0228250 A1* | 12/2003 | Takeuchi | 423/460 |
| 2004/0018431 A1 | 1/2004 | Gozdz et al. | |
| 2004/0033360 A1 | 2/2004 | Armand et al. | |
| 2004/0265695 A1 | 12/2004 | Barker et al. | |
| 2005/0238961 A1* | 10/2005 | Barker et al. | 429/231.4 |
| 2007/0160752 A1* | 7/2007 | Mao | 427/212 |

FOREIGN PATENT DOCUMENTS

| | | | |
|---|---|---|---|
| EP | 1094532 A1 | 4/2001 |
| JP | 3523397 B2 | 5/1997 |
| JP | 2003-323894 A | 11/2003 |
| JP | 2006-073259 A | 3/2006 |
| WO | 0227823 | 4/2002 |

OTHER PUBLICATIONS

Ni Jiangfeng et al., Study of LiMPO4 as Cathode Material for Lithium Ion Batteries, China Academic Journal Electronic Publishing House, Jul. 2004, vol. 16, No. 4, pp. 554-560.

A.K. Padhi, et al. "Phospho-olivines as Positive-Electrode Materials for Rechargeable Lithium Batteries." J. Electrochem. Society, vol. 144, No. 4, Apr. 1997, pp. 1188-1194.

Zhaohui Chen, et al. "Reducing Carbon in LiFePO4/C Composite Electrodes to Maximize Specific Energy, Volumetric Energy, and Tap Density." Journal of the Electrochemical Society, vol. 149, No. 9, 2002 pp. A1184-A1189.

K.S. Park et al. "Surface Modification by Silver Coatng for Improving Electrochemical Properties of LiFePO4." Solid State Communications vol. 129, 2004, pp. 311-314.

A. Yamada, et al. "Optimized LiFePO4 for Lithium Battery Cathodes." Journal of the Electrochemical Society, vol. 148, No. 3, 2001, pp. A224-A229.

* cited by examiner

Specific Capacity (mAh/g)

Specific Capacity (mAh/g)

1st 153mAh/g
2nd 142mAh/g

Specific Capacity (mAh/g)

US 8,865,349 B2

METHOD OF PRODUCING POSITIVE ELECTRODE ACTIVE MATERIAL AND NONAQUEOUS ELECTROLYTE BATTERY USING THE SAME

TECHNICAL FIELD

The present invention relates to a positive electrode active material for nonaqueous electrolyte batteries, to a method of producing this positive electrode active material, and to a nonaqueous electrolyte battery having this positive electrode active material as a constituent element. More particularly, the present invention relates to a positive electrode active material for use in secondary batteries, for example, lithium metal batteries, lithium ion batteries, lithium polymer batteries, and so forth, that have an alkali metal, such as lithium metal, or an alloy or compound thereof in the negative electrode active material; to a method of producing this positive electrode active material; and to a secondary battery that has a positive electrode active material produced by this method.

BACKGROUND ART

Secondary batteries, for example, lithium metal batteries, lithium ion batteries, lithium polymer batteries, and so forth, that have an alkali metal, such as lithium metal, or an alloy or compound thereof in the negative electrode active material, have high capacities and as a result have been in the spotlight in recent years. A variety of materials have been investigated as rare metal-free positive electrode active materials for such secondary batteries, with a view to boosting their performance and capacity while lowering their cost. For example, Patent document 1 describes a positive electrode active material based on an olivine-type transition metal phosphate complex represented by the general formula $A_yMPO_4$ (in the formula, A is an alkali metal, M is a transition metal comprising the combination of both Co and Fe, and $0<y<2$). Among transition metal phosphate complexes, lithium manganese phosphate ($LiMnPO_4$), in which the alkali metal is Li and the transition metal is Mn, are known to have a wider atomic spacing between metal elements in the crystal structure than positive electrode active materials based on other transition metal oxides and even among olivine-type transition metal phosphate complexes are known in particular to have poor rate characteristics. $LiMnPO_4$ has a theoretical capacity of approximately 170 mAh/g, or about the same as $LiFePO_4$, but numerous reports have indicated that its utilization ratio is much worse than that of $LiFePO_4$ even under low rate discharge conditions (for example, Non-Patent document 1). For example, in the case of $LiFePO_4$, there have been efforts to improve its rate characteristics through the use of a carbon coating (Non-Patent document 2), a noble metal support (Non-Patent document 3), an increase in the reaction surface area by low-temperature synthesis microfine-sizing (Non-Patent document 4), and so forth, and improvements in the rate characteristics have in fact been recognized. In the case of $LiMnPO_4$, however, there have been no reports of a method for which a clear improvement in the rate characteristics has been seen.

Patent document 1: Japanese Patent No. 3,523,397
Non-Patent document 1: A. K. Padhi, K. S. Nanjundaswamy and J. B. Goodenough, *J. Electrochem. Soc.*, Vol. 144, No. 4, 1188-1193 (1997)
Non-Patent document 2: Z. Chen and J. R. Dahn, *J. Electrochem. Soc.*, Vol. 149, No. 9, A1184-A1189 (2002)
Non-Patent document 3: K. S. Park, J. T. Son, H. T. Chung, S. J. Kim, C. H. Lee, K. T. Kang and H. G. Kim, *Solid State Comm.*, Vol. 129, 311-314 (2004)
Non-Patent document 4: A. Yamada, S. C. Chung and K. Hinokuma, *J. Electrochem. Soc.*, Vol. 148, No. 3, A224-A229 (2001)

DISCLOSURE OF THE INVENTION

Problems to be Solved by the Invention

An object of the present invention is to provide a positive electrode active material that has rate characteristics suitable for nonaqueous electrolyte batteries and particularly nonaqueous electrolyte secondary batteries, a method by which this positive electrode active material can be easily mass produced, and a high-performance nonaqueous electrolyte battery that has a positive electrode active material obtained by this method.

Means for Solving the Problems

The present inventors achieved the present invention as a result of intensive investigations in order to produce a positive electrode active material that would exhibit the excellent characteristics cited above.

That is, the present invention provides the following.

[1] A method of producing a positive electrode active material, the method comprising a step of mixing a carbon source with lithium manganese phosphate $LiMnPO_4$ or a compound $LiMn_{1-x}M_xPO_4$ containing lithium manganese phosphate $LiMnPO_4$ as a solid solution composition (where, $0 \leq x < 1$ and M is at least one metal element selected from the group consisting of Co, Ni, Fe, Zn, Cu, Ti, Sn, Zr, V, and Al), and heat treating the obtained mixture under an inert gas atmosphere.

[2] The production method according to [1], wherein the carbon source comprises at least one of carbon particles and a carbon precursor.

[3] The production method according to [2], wherein the carbon particles are acetylene black.

[4] A nonaqueous electrolyte battery having a positive electrode comprising positive electrode active material produced by a method according to any of [1] to [3].

BEST MODE FOR CARRYING OUT THE INVENTION

[The Positive Electrode Active Material]

Figure 1:
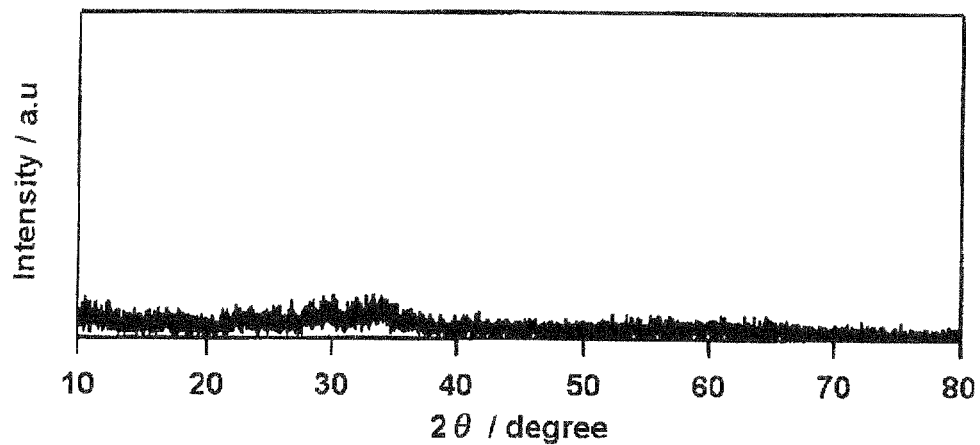
FIG. 1 is the x-ray profile of $LiMnPO_4$ produced in Preparative Example 1, in this case the product of a planetary ball mill wet-type low-temperature synthesis with heat treatment at 100° C.

The positive electrode active material used by the production method of the present invention comprises particles of lithium manganese phosphate $LiMnPO_4$ or a compound $LiMn_{1-x}M_xPO_4$ (in the formula, $0 \leq x < 1$ and M is at least one metal element selected from the group consisting of Co, Ni, Fe, Zn, Cu, Ti, Sn, Zr, V, and Al) containing lithium manganese phosphate $LiMnPO_4$ as a solid solution composition and carbon on the surface of these particles.

The metal element M present in the aforementioned compound with general formula $LiMn_{1-x}M_xPO_4$ in addition to Mn is preferably at least one selection from Co, Ni, Fe, and Cu. x indicates the proportion of the non-manganese metal element M and is preferably $0 \leq x < 0.7$, more preferably $0 \leq x \leq 0.5$, and even more preferably is $0 \leq x \leq 0.3$.

Lithium manganese phosphate resides in the orthorhombic Pnma space group, and $FeO_6$ octahedra and $PO_4$ tetrahedra therein form a vertex-sharing and edge-sharing framework. It has Li diffusion paths parallel to the a axis and the c axis, allowing it to function as an intercalation host for the lithium ion. A characteristic feature of the positive electrode active material of the present invention is that carbon is present on surface of the particles of a compound that contains this lithium manganese phosphate as its main component. According to research by the present inventors, it is by means of this characteristic feature that the positive electrode active material of the present invention has excellent rate characteristics that are well adapted for nonaqueous electrolyte batteries. It is known that lithium manganese phosphate ($LiMnPO_4$) does not have good rate characteristics. As a consequence, the individual skilled in the art would have predicted that a positive electrode active material having lithium manganese phosphate as its main component would not have good rate characteristics. However, contrary to this expectation, the positive electrode active material of the present invention was discovered to have good rate characteristics notwithstanding the fact that its main component is lithium manganese phosphate. Without being bound to any theory, it is thought that, in the process in which the $LiMnPO_4$ is heat treated (annealed) in combination with a prescribed amount of carbon in an inert gas atmosphere, the carbon takes up oxygen from the $LiMnPO_4$ surface and this partial reduction contributes to an increase in the electroconductivity.

The positive electrode preferably contains at least 25 weight % and particularly at least 50 weight % lithium manganese phosphate $LiMnPO_4$ or a compound $LiMn_{1-x}M_xPO_4$ (in the formula, $0 \leq x < 1$ and M is at least one metal element selected from the group consisting of Co, Ni, Fe, Zn, Cu, Ti, Sn, Zr, V, and Al) containing lithium manganese phosphate $LiMnPO_4$ as a solid solution composition.

Components other than the lithium manganese phosphate $LiMnPO_4$ or compound $LiMn_{1-x}M_xPO_4$ ($0 \leq x < 1$) containing it as a solid solution composition, can be exemplified by $LiMn_2O_4$, which has a discharge plateau around 3 to 5 V, which is in the vicinity of the discharge potential of the preceding; 4 V-class positive electrode active materials such as $LiCoO_2$, $LiNiO_2$, and so forth; olivine-type transition metal phosphate complexes such as $LiCoPO_4$, $LiFePO_4$, $LiNiPO_4$, $LiCuPO_4$, and so forth; and NASICON-type transition metal phosphate complexes such as $Li_3Fe_2(PO_4)_3$, $Li_3V_2(PO_4)_3$, $Li_3Ti_2(PO_4)_3$, and so forth.

The particle diameter of the particles of lithium manganese phosphate or compound containing lithium manganese phosphate as a solid solution ingredient component, is preferably as small as possible. This particle size can be adjusted by a grinding method that uses, for example, a planetary ball mill, ultrasound, jet mill, shaker, and so forth.

The particle diameter of the positive electrode active material of the present invention, which comprises particles of lithium manganese phosphate or a compound containing lithium manganese phosphate as a solid solution ingredient component and carbon on the surface thereof, is preferably 1 μm to 50 nm and more preferably is 200 nm to 100 nm. When the particle diameter of the positive electrode active material is too large, surface coating by the carbon and surface partial reduction will be inadequate and an adequate capacity will not be obtained.

The carbon content in the positive electrode active material of the present invention, expressed with reference to the electrode, is preferably no more than 25 weight % and more preferably is in the range of 25 to 5 weight %.

It is known that carbon particles intrinsically have a large surface area. In addition, when one considers that the presence of carbon on the surface of the particles of the lithium manganese phosphate or compound containing lithium manganese phosphate as a solid solution ingredient component achieves a sintering inhibiting effect and promotes microfine-sizing of the particles, it would ordinarily be thought that the surface area of the obtained positive electrode active material particles as a whole would be increased by the attachment of carbon. However, contrary to this expectation in the art, it has been discovered that the positive electrode active material of the present invention exhibits relatively low values for the particle surface area. When one considers that the positive electrode active material of the present invention has both a small particle diameter and a small surface area, the conclusion is drawn that the carbon particles occur on the surface of the particles of the lithium manganese phosphate compound or compound containing lithium manganese phosphate as a solid solution ingredient component in a manner that forms a smooth layer, thus diminishing the asperities on the surface of the positive electrode active material particles.

While the positive electrode active material of the present invention mainly comprises a composite of carbon and the aforementioned lithium manganese phosphate or compound containing lithium manganese phosphate as a solid solution ingredient component, various materials may also be present on the surface of these particles, for example, another positive electrode active material such as $LiMn_2O_4$ and so forth.

[The Method of Producing the Positive Electrode Active Material]

The positive electrode active material of the present invention can be produced by a method comprising the steps of mixing a carbon source with the lithium manganese phosphate or compound containing lithium manganese phosphate as a solid solution ingredient component and particularly mixing in such a manner that the carbon source becomes distributed on the surface of the compound, and heat treating the obtained mixture in an inert gas atmosphere.

(The Lithium Manganese Phosphate or Compound that Contains Lithium Manganese Phosphate as a Solid Solution Ingredient Component)

The lithium manganese phosphate or compound that contains lithium manganese phosphate as a solid solution ingredient component can be prepared by mixing $LiMnPO_4$ with any other optional components and carrying out a heat treatment, a process of melting and rapid cooling, a process of melting with slow cooling, a mechanical milling treatment, a sonochemical treatment, a sol-gel process, and so forth. For example, the starting materials in particulate form can be mixed and then heat treated; or aqueous solutions of the starting materials can be mixed and the obtained product can be filtered off, washed with water, dried, and so forth, followed by heat treatment.

The lithium manganese phosphate can be produced by known methods. More specifically, production can be carried out by preparing a slurry by mixing a lithium source, manganese source, and phosphorus source with excess pure water in such a manner that the Li:Mn:P molar ratio is 1:1:1, and subjecting this slurry to a heat treatment under an oxidizing atmosphere. In order to obtain uniform and microfine lithium manganese phosphate particles, mixing is preferably carried out using a comminuting device such as a planetary ball mill, ultrasound, jet mill, shaker, and so forth.

The counter-anion in the starting Mn salt and M salt is not particularly limited, and, for example, the sulfate salt, nitrate salt, chloride salt, acetate salt, and so forth, can be used. The use of organic acid salts, such as the acetate salt, and the use of the sulfate salt and so forth are preferred from the standpoint of avoiding residual impurities in the obtained positive electrode active material.

The lithium source can be exemplified by lithium carbonate, lithium acetate, lithium hydroxide, lithium chloride, lithium oxalate, and so forth.

The manganese source can be exemplified by manganese powder, manganese oxide, manganese carbonate, manganese acetate, manganese hydroxide, manganese chloride, manganese oxalate, and so forth.

The phosphate source can be exemplified by phosphorus pentoxide, phosphoric acid, ammonium dihydrogen phosphate, diammonium hydrogen phosphate, and so forth. Phosphorus pentoxide and phosphoric acid are very suitable since it is preferable to minimize production of by-product ammonia gas during the heat treatment step. With regard to the use of phosphoric acid as a starting material, since phosphoric acid is generally acquired in the form of the aqueous solution, phosphoric acid is preferably used after its content (purity) has been accurately determined, for example, by titration and so forth.

In addition, a compound whose main component is lithium manganese phosphate that is uniform and that exhibits good crystallinity, can be produced when the product obtained by mixing aqueous solutions of the starting materials is used as the precursor prior to heat treatment.

Heat treatment of the lithium manganese phosphate can be carried out using a single-step temperature ramp up from ambient temperature to the heat treatment completion temperature (100 to 800° C. and more preferably 300 to 650° C.) and a holding step. It can also be carried out divided into two stages, i.e., a heat treatment step in a low temperature range (ambient temperature to 300° C.) (pre-calcination) and a heat treatment step in a high temperature range (300 to 800° C.) (main calcination). For example, lithium manganese phosphate can be synthesized by mixing lithium carbonate as the lithium source and manganese metal powder as the manganese source into aqueous phosphoric acid using the stoichiometric proportions; carrying out a reaction by stirring for 2 days using a magnetic stirrer; and heat treating for 24 hours in air at 100 to 600° C., yielding a crystalline lithium manganese phosphate or a noncrystalline lithium manganese phosphate depending on the heat treatment temperature. Lithium manganese phosphate can also be synthesized by raising the temperature to at least 1100° C. and carrying out melting with slow cooling in a single stretch or melting with rapid cooling, yielding a crystalline lithium manganese phosphate or a noncrystalline lithium manganese phosphate depending on the cooling rate.

(The Carbon Source)

The carbon source comprises at least one of carbon particles and a carbon precursor that is converted to carbon by the heat treatment. The use of a carbon precursor as the carbon source enables the production at relatively low temperatures of a positive electrode active material that has a low surface area.

The known carbon particles can be used without limitation as the carbon particles, and examples here are carbon blacks such as acetylene black, ketjen black, and so forth, as well as pitch coke, mesocarbon microbeads, carbon nanotubes, carbon fiber, and so forth. The carbon precursor can be exemplified by natural and synthetic organic polymer compounds (particularly water-soluble species) such as polyvinylidene fluoride (PVdF), polyvinyl alcohol, polyolefins, polyacrylonitrile, cellulose, starch, granulated sugar, and so forth; acetone; and polymerizable monomers (particularly unsaturated organic compounds that contain a carbon-carbon double bond) such as acrylonitrile, divinylbenzene, vinyl acetate, and so forth. In particular, the use of polyvinyl alcohol as the carbon source provides a substantial effect with regard to keeping a low specific surface area in the obtained positive electrode active material.

The quantity of carbon source addition is not limited, but certainly is to be in a range at which the carbon fraction remaining after heat treatment is not excessive in a positive electrode. Considered with reference to the electrode, addition at no more than 25 weight % and particularly in the range of 25 to 5 weight % is desirable. Viewed from the perspective of obtaining a uniform mixture, addition is preferably carried out using a comminuting device as cited above.

(The Heat Treatment Step)

The heat treatment step is a step in which particles of the positive electrode active material of the present invention are produced by introducing thermal energy into the mixture of the carbon source and lithium manganese phosphate or a compound containing lithium manganese phosphate as a solid solution ingredient component, in order to cause carbon to be present in a stable manner on the surface of the particles of the compound under consideration and in order to bring about volatilization and elimination of impurities. Lithium manganese phosphate obtained as described above by itself does not have a satisfactory electroconductivity and is unable to manifest excellent rate characteristics. In order to improve the rate characteristics of lithium manganese phosphate, this step in which heat treatment together with a carbon source is carried out under an inert gas atmosphere is therefore necessary in order to produce the positive electrode active material of the present invention.

The heat treatment is carried out under an inert gas atmosphere. The inert gas can be exemplified by nitrogen, helium, neon, argon, and so forth.

The heat treatment step is as a general matter carried out at a temperature at which the added carbon takes up oxygen from the surface of the positive electrode specimen and is thereby volatilized, and its effectiveness when carried out preferably at a temperature of at least 250° C., more preferably 400 to 600° C., and particularly at about 500° C. was confirmed from TG-MS measurements and the like. As a general matter, the heat treatment time is less than several hours and preferably is from 30 minutes to 2 hours and particularly is about 1 hour.

The present invention, in which a carbon source is added to lithium manganese phosphate or a compound containing lithium manganese phosphate as a solid solution ingredient component and heat treatment is then carried out, can prevent the carbon source from being foamed by gas generated by decomposition of the lithium manganese phosphate during the heat treatment. As a result, the carbon source, residing in a fused state, spreads in a melt state more uniformly over the surface of the lithium manganese phosphate, enabling a more uniform deposition of the carbon on the surface of the lithium manganese phosphate particles. As a consequence, an even better surface electroconductivity is generated for the obtained positive electrode active material and particle-to-particle contact is strongly stabilized.

The positive electrode active material of the present invention obtained as described above exhibits a reversible 4 V discharge plateau against a lithium negative electrode and can be very suitably used as a constituent material of nonaqueous electrolyte batteries and particularly nonaqueous electrolyte secondary batteries. The positive electrode active material of the present invention can function as an electrode active material for secondary batteries by means of the insertion/de-insertion of various cations. The lithium ion is particularly preferred as the inserted/de-inserted cation.

[The Nonaqueous Electrolyte Battery]

An electrode having the positive electrode active material of the present invention can be very suitably used as an electrode for batteries having various shapes, e.g., coin, cylindrical, square, and so forth. For example, an electrode with, for example, a pellet shape, can be formed by press molding this electrode active material. In addition, a plate-shaped or sheet-shaped electrode can be formed by bonding this electrode active material to a current collector comprising an electroconductive material, for example, a metal.

(Battery Structure)

Figure 30:
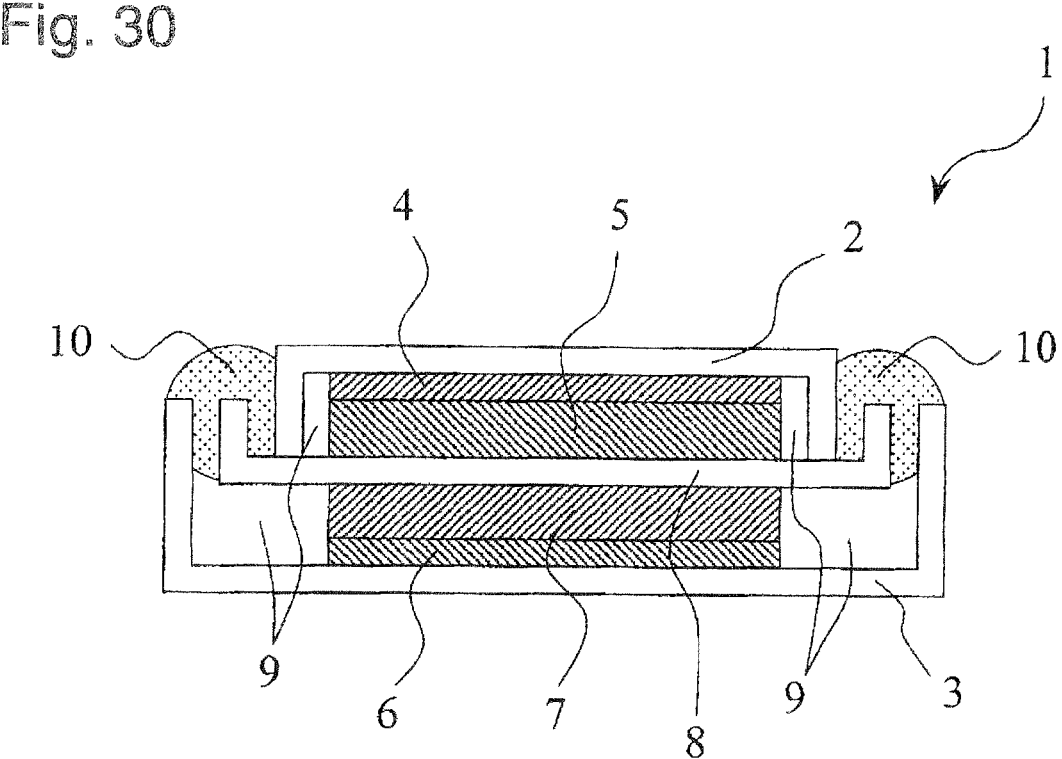
FIG. 30 is a cross-sectional schematic drawing of a battery.

An example of a nonaqueous electrolyte battery that uses the positive electrode active material of the present invention will be described with reference to the drawings appended herewith. A cross-sectional drawing that shows a schematic of the battery is given in FIG. 30. Broadly speaking, the nonaqueous electrolyte battery 1 in this figure has a negative electrode member 2, which functions as an external negative electrode for the battery; a positive electrode member 3, which functions as an external positive electrode for the battery; and, situated between the preceding two members in the sequence given, a negative electrode current collector 4, a negative electrode active material 5, a separator 8, a positive electrode active material 7, and a positive electrode current collector 6. The negative electrode member 2 has an approximately cylindrical shape and is configured so as to be able to hold the negative electrode current collector 4 and the negative electrode active material 5 in its interior. The positive electrode member 3, on the other hand, also has an approximately cylindrical shape and is configured so as to be able to hold the positive electrode current collector 6 and the positive electrode active material 7 in its interior. The radial dimension of the positive electrode member 3 and the radial dimension of the separator 8 are set somewhat larger than the radial dimension of the negative electrode member 2, and the peripheral edge of the negative electrode member 2 is therefore overlapped by the peripheral edge of the separator 8 and the peripheral edge of the positive electrode member 3. The space in the interior of the battery is filled with a nonaqueous electrolyte 9, and a sealant 10 is placed in the overlap zone of the peripheral edges of the negative electrode member 2, the separator 8, and the positive electrode member 3, thereby maintaining the interior of the battery in an airtight condition.

For the negative electrode, the negative electrode member 2 forms an external negative electrode; the negative electrode current collector 4 is formed in contact therewith; and a layer of negative electrode active material 5 is formed on the negative electrode current collector. For example, nickel foil, copper foil, and so forth, can be used as the negative electrode current collector. A negative electrode active material capable of lithium insertion/de-insertion is used as the negative electrode active material, and, for example, lithium metal, lithium alloys, lithium-doped electroconductive polymers, layer compounds (carbon materials, metal oxides, and so forth), and the like, are specifically used. The binder present in the negative electrode active material layer can be exemplified by poly(vinylidene fluoride) (PVdF), poly(tetrafluoroethylene) (PTFE), poly(vinylidene fluoride/hexafluoropropylene) copolymer (PVdF-HFP), and so forth. In particular, because lithium metal foil can be used not only for the negative electrode active material, but also for the negative electrode current collector, a simple and convenient battery structure can be elaborated by using lithium metal foil for the negative electrode.

For the positive electrode, the positive electrode member 3 forms an external positive electrode; the positive electrode current collector 6 is formed in contact therewith; and a layer of positive electrode active material 7 is formed on the positive electrode current collector. The positive electrode active material of the present invention as described hereinabove is used as the positive electrode active material. The positive electrode current collector can be, for example, aluminum foil and so forth. The binder present in the positive electrode active material layer can be exemplified by poly(vinylidene fluoride) (PVdF), poly(tetrafluoroethylene) (PTFE), poly(vinylidene fluoride/hexafluoropropylene) copolymer (PVdF-HFP), and so forth. The positive electrode active material layer can contain an electroconductive material in order to raise the electroconductivity. This electroconductive material can be exemplified by graphite, acetylene black, and so forth.

The separator 8 divides the positive electrode from the negative electrode, and those materials generally known for use as a separator in nonaqueous electrolyte batteries of this type can be used. For example, a polymer film of, e.g., polypropylene, or a porous polyethylene carbonate membrane, and so forth, can be used. In addition, the separator is desirably as thin as possible given the relationship between lithium ion conductivity and energy density. In specific terms, the separator thickness is, for example, preferably no more than 50 μm.

The resins generally known for use as sealants for the positive electrode active material layer of nonaqueous electrolyte batteries of this type can be used as the sealant 10.

The nonaqueous electrolyte can assume various forms and can be not only a liquid electrolyte, but can also be a solid electrolyte, a solvent-containing electrolyte gel, and so forth. Solutions obtained by dissolving an electrolyte in an aprotic nonaqueous solvent are used as the liquid electrolyte.

The nonaqueous solvent can be exemplified by cyclic carbonates such as ethylene carbonate, propylene carbonate, butylene carbonate, vinylene carbonate, and so forth; chain carbonates such as dimethyl carbonate, diethyl carbonate, dipropyl carbonate, ethyl methyl carbonate, and so forth; and lactones such as γ-butyrolactone, and so forth; 1,2-dimethoxyethane, 1,2-diethoxyethane, dioxane, 1,3-dioxolane, 3-methyl-1,3-dioxolane, nitromethane, N,N-dimethylformamide; sulfones such as dimethylsulfoxide, sulfolane, and so forth; esters such as methyl propionate, methyl butyrate, and so forth; nitriles such as acetonitrile, propionitrile, and so forth; ethers such as tetrahydrofuran, 2-methyltetrahydrofuran, and so forth. In particular, the use of cyclic carbonates such as ethylene carbonate, propylene carbonate, vinylene carbonate, and so forth, and chain carbonates such as dimethyl carbonate, diethyl carbonate, dipropyl carbonate, and so forth, is preferred from the standpoint of voltage stability. A single such nonaqueous solvent can be used or a mixture of two or more can be used.

A lithium salt of a lithium compound (lithium salt), for example, $LiPF_6$, $LiClO_4$, $LiAsF_6$, $LiBF_4$, $LiCF_3SO_3$, $LiN(CF_3SO_2)_2$, $LiC_4F_9SO_3$, $LiC(CF_3SO_2)_3$, $LiClO_4$, and so forth, can be used as the electrolyte. The use of $LiPF_6$ and $LiBF_4$ is preferred among the preceding lithium salts. A single such electrolyte can be used or a mixture of two or more can be used.

The solid electrolyte can be exemplified by solid inorganic electrolytes such as lithium nitride, lithium iodide, and so forth, and by organic polymer electrolytes such as poly(ethylene oxide), poly(methacrylate), poly(acrylate), and so forth. In addition, there are no particular restrictions on the material that can be used to form an electrolyte gel as long as this material can absorb a liquid electrolyte as described above with gelation; examples here are fluoropolymers such as poly(vinylidene fluoride), vinylidene fluoride/hexafluoropropylene copolymer, and so forth.

(The Method of Battery Production)

A nonaqueous electrolyte battery that uses the positive electrode active material of the present invention can be produced, for example, as follows.

The method of producing the negative electrode will be described first. A slurry is prepared by dispersing the negative electrode active material and binder in a solvent. The obtained slurry is uniformly coated on the current collector and dried thereon to form a layer of negative electrode active material. The resulting laminate comprising the negative electrode current collector and the negative electrode active material layer is then installed within the negative electrode member in such a manner that the negative electrode current collector and the interior surface of the negative electrode member are in contact, thereby forming the negative electrode. In addition, lithium metal foil can also be directly used as the negative electrode current collector and the negative electrode active material as described above.

The method of producing the positive electrode will now be described. A slurry is prepared by dispersing the positive electrode active material of the present invention, electroconductive material, and binder in a solvent. This slurry is uniformly coated on the current collector and dried thereon to form a positive electrode active material layer. The resulting laminate comprising the positive electrode current collector and the positive electrode active material layer is then installed in the positive electrode member in such a manner that the positive electrode current collector is in contact with the inner surface of the positive electrode member, thereby forming the positive electrode.

When a liquid nonaqueous electrolyte is used, the liquid nonaqueous electrolyte is prepared by dissolving the electrolyte salt in a nonaqueous solvent.

The negative electrode and positive electrode prepared as described above are then stacked on one another with a separator interposed between the negative electrode active material layer and the positive electrode active material layer; the nonaqueous electrolyte is then introduced; and the nonaqueous electrolyte battery is completed by sealing the battery interior with sealant.

The nonaqueous electrolyte battery of the present invention is not particularly limited to the configuration discussed above and can have, inter alia, a cylindrical, square, coin, or button shape, and can be executed in various sizes, for example, thin, large-scale, and so forth. In addition, the present invention can be used for primary batteries and secondary batteries.

EXAMPLES

The present invention is described in detail herebelow based on examples, but the present invention is not limited to these examples.

Preparative Example 1

Preparation of an $LiMnPO_4$ Powder Specimen by Processing for 24 Hours with a Planetary Ball Mill The following starting materials were weighed out and mixed in the stoichiometric ratio in an argon glove box so as to give a total of 10 g: lithium carbonate ($Li_2CO_3$, 98%, Wako Pure Chemical Industries, Ltd.) as the lithium source, manganese powder (Mn, 98%, Wako Pure Chemical Industries, Ltd.) as the manganese source, and diphosphorus pentoxide ($P_2O_5$, 98%, Wako Pure Chemical Industries, Ltd.) as the phosphorus source. The resulting mixture was removed from the glove box and introduced into 50 mL pure water and a reaction was run by stirring for 2 days using a magnetic stirrer. Then, in order to bring the reaction to completion, processing was carried out for 24 hours with a planetary ball mill (Ito Manufacturing, 250-mL partially stabilized zirconia pot) at 200 rpm. Balls were added to a total of 100 g, i.e., 3-mm diameter balls and five balls with a 10-mm diameter, for stirring with the planetary ball mill. This was followed by heat treatment for 24 hours in the air, at 100° C., 350° C., or 600° C.

Identification was carried out using a powder x-ray diffraction instrument (Rigaku RINT 2100HLR/PC). The specimen obtained by heat treatment for 24 hours at 100° C. was confirmed to be x-ray amorphous from the x-ray diffraction results shown in FIG. 1.

Figure 2:
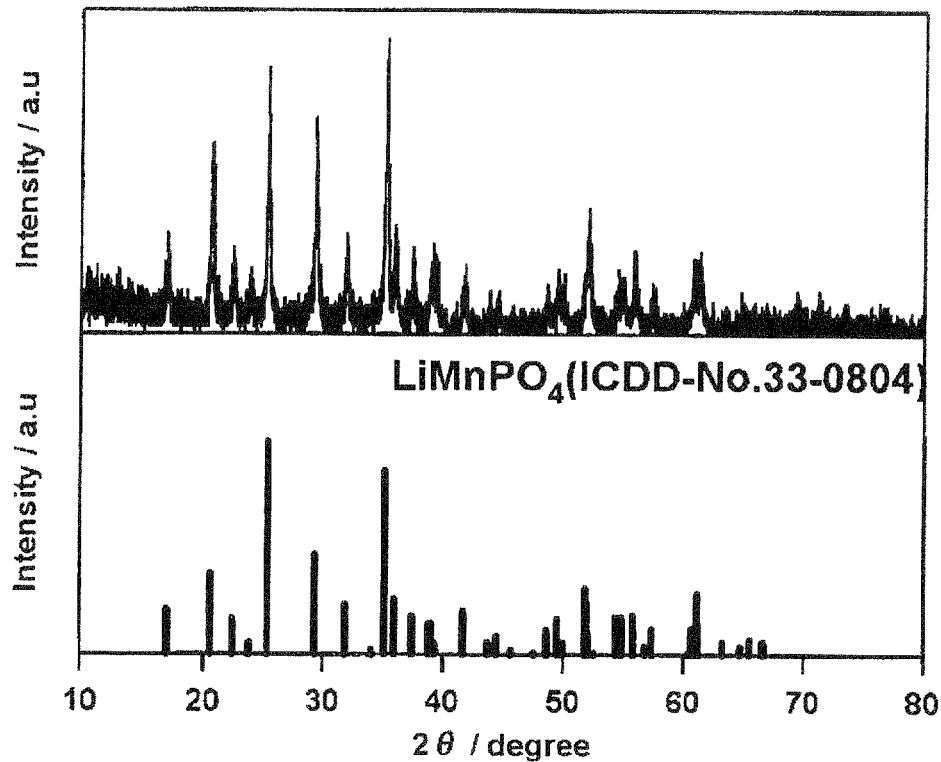
FIG. 2 is the x-ray profile of $LiMnPO_4$ produced in Preparative Example 1, in this case the product of a planetary ball mill wet-type low-temperature synthesis with heat treatment at 350° C.
Figure 3:
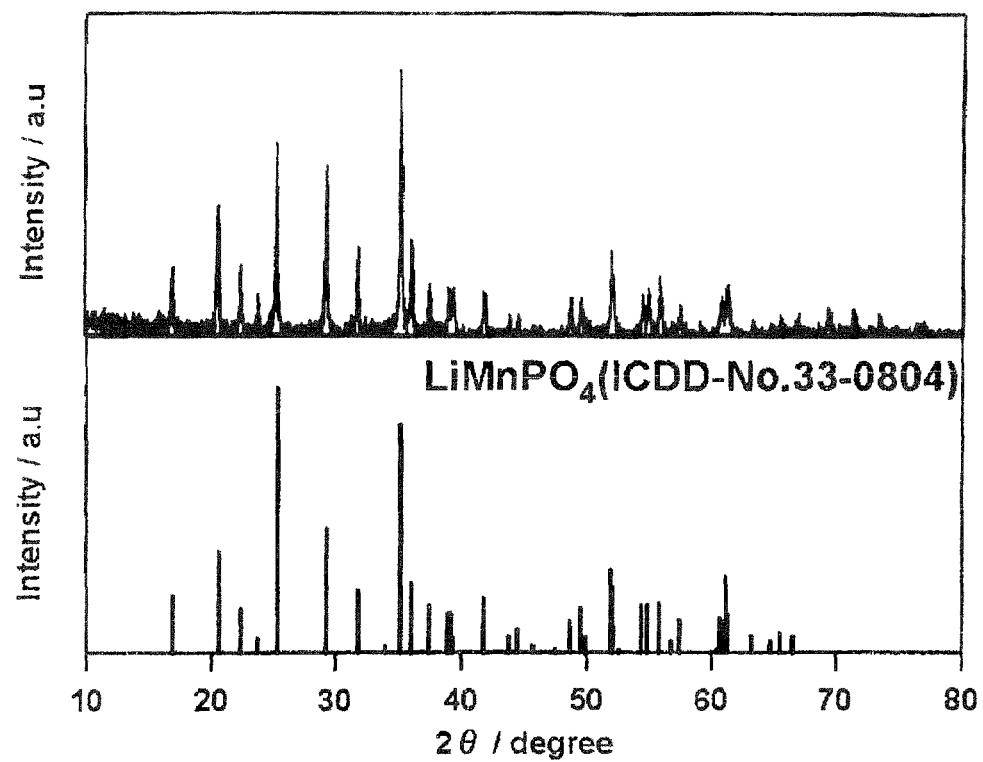
FIG. 3 is the x-ray profile of $LiMnPO_4$ produced in Preparative Example 1, in this case the product of a planetary ball mill wet-type low-temperature synthesis with heat treatment at 600° C.

The specimen obtained by heat treatment for 24 hours at 350° C. and the specimen obtained by heat treatment for 24 hours at 600° C. were both confirmed to be an orthorhombic Pnma lithium manganese phosphate (ICDD No. 33-0804) single phase from the x-ray diffraction results shown, respectively, in FIGS. 2 and 3.

Preparative Example 2

Figure 4:
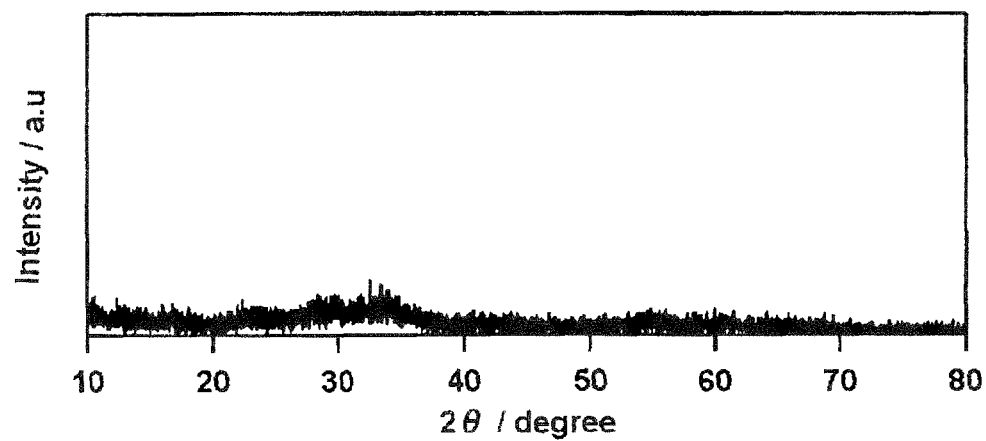
FIG. 4 is the x-ray profile of $LiMnPO_4$ produced in Preparative Example 2, in this case the product of a stirrer-mixed wet-type low-temperature synthesis with heat treatment at 100° C.
Figure 5:
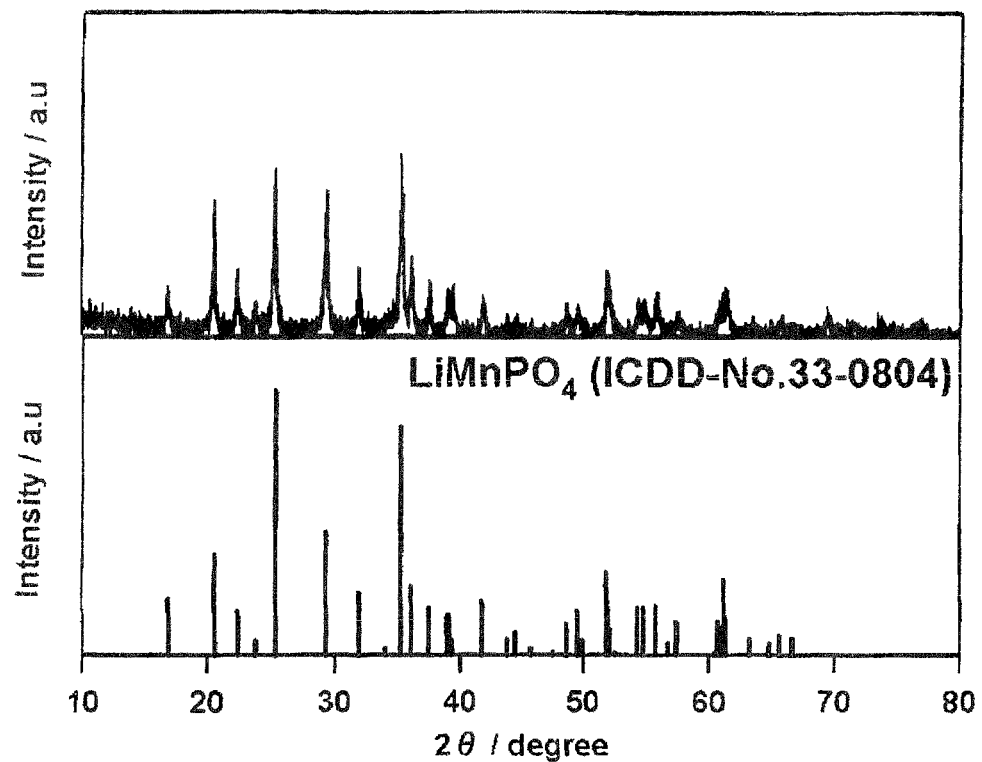
FIG. 5 is the x-ray profile of $LiMnPO_4$ produced in Preparative Example 2, in this case the product of a stirrer-mixed wet-type low-temperature synthesis with heat treatment at 350° C.

Preparation of an $LiMnPO_4$ Powder Specimen by Stirring for 5 Days with a Magnetic Stirrer The following starting materials were weighed out and mixed in the stoichiometric ratio in an argon glove box so as to give a total of 10 g: lithium carbonate ($Li_2CO_3$, 98%, Wako Pure Chemical Industries, Ltd.) as the lithium source, manganese powder (Mn, 98%, Wako Pure Chemical Industries, Ltd.) as the manganese source, and diphosphorus pentoxide ($P_2O_5$, 98%, Wako Pure Chemical Industries, Ltd.) as the phosphorus source. The resulting mixture was removed from the glove box and introduced into 50 mL pure water; a reaction was run by stirring for 5 days using a magnetic stirrer; and this was followed by heat treatment for 24 hours in the air at 100° C. or 350° C. as in Preparative Example 1. The $LiMnPO_4$ obtained by heat treatment for 24 hours at 100° C. was confirmed to be x-ray amorphous from the x-ray diffraction results shown in FIG. 4. The specimen obtained by heat treatment for 24 hours at 350° C. was confirmed to be an orthorhombic Pnma lithium manganese phosphate (ICDD No. 33-0804) single phase from the x-ray diffraction results shown in FIG. 5. This preparative example shows that LiMnPO$_4$ can also be prepared by a stirring process that uses only a magnetic stirrer, when the stirring time is increased to a certain extent.

Preparative Example 3

Preparation of an LiMnPO$_4$ Powder Specimen by Solid Phase Calcination

Figure 6:
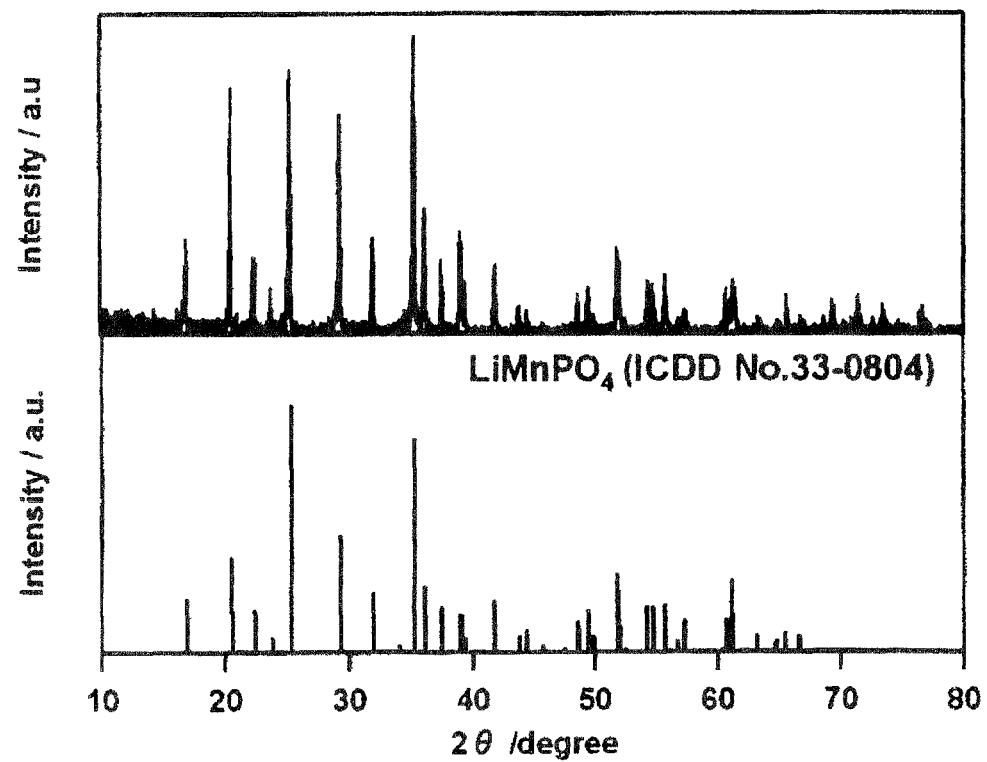
FIG. 6 is the x-ray profile of LiMnPO$_4$ produced in Preparative Example 3, in this case the product of solid phase calcination.

The following starting materials were weighed out and mixed in the stoichiometric ratio in an argon glove box so as to give a total of 10 g: lithium carbonate (Li$_2$CO$_3$, 98%, Wako Pure Chemical Industries, Ltd.) as the lithium source, manganese(III) oxide (Mn$_2$O$_3$, 99.9%, Furuuchi Chemical Corporation) as the manganese source, and diphosphorus pentoxide (P$_2$O$_5$, 98%, Wako Pure Chemical Industries, Ltd.) as the phosphorus source. This was followed by pre-calcination for 15 hours at 500° C. and then main calcination for 48 hours at 800° C. Both pre-calcination and main calcination were carried out in air. The resulting powder specimen was confirmed to be an orthorhombic Pnma lithium manganese phosphate (ICDD No. 33-0804) single phase from the x-ray diffraction results shown in FIG. 6.

Preparative Example 4

Preparation of an LiMnPO$_4$ Specimen by Melting and Slow Cooling

Figure 7:
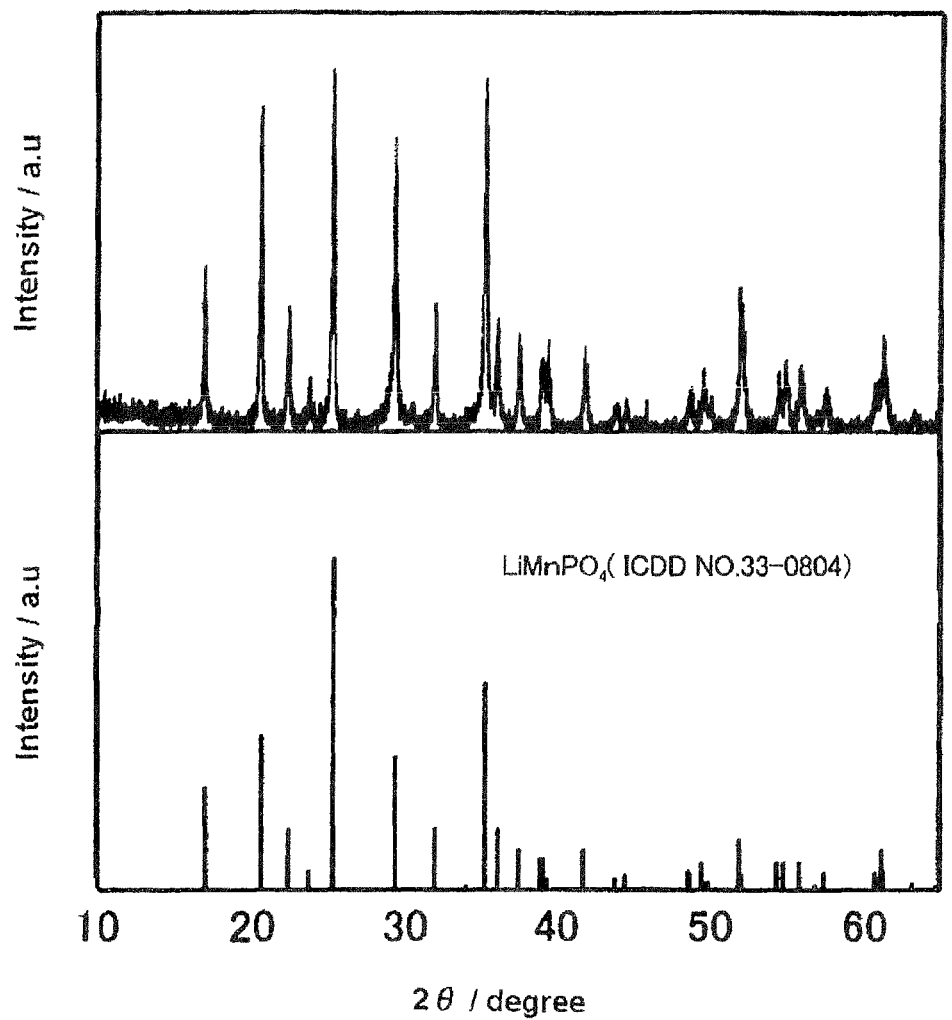
FIG. 7 is the x-ray profile of LiMnPO$_4$ produced in Preparative Example 4, in this case the product yielded by melting and slow cooling.

The following starting materials were weighed out and mixed in the stoichiometric ratio in an argon glove box so as to give a total of 10 g: lithium carbonate (Li$_2$CO$_3$, 98%, Wako Pure Chemical Industries, Ltd.) as the lithium source, manganese(II) oxide (MnO, 99.9%, Furuuchi Chemical Corporation) as the manganese source, and diphosphorus pentoxide (P$_2$O$_5$, 98%, Wako Pure Chemical Industries, Ltd.) as the phosphorus source. After this, and while operating under an argon atmosphere, melting was carried out for 5 minutes at 1500° C. followed by gradual cooling to room temperature at a rate of temperature decline of 200° C./hour. The resulting powder specimen was confirmed to be an orthorhombic Pnma lithium manganese phosphate (ICDD No. 33-0804) single phase from the x-ray diffraction results shown in FIG. 7

Preparative Example 5

Figure 8:
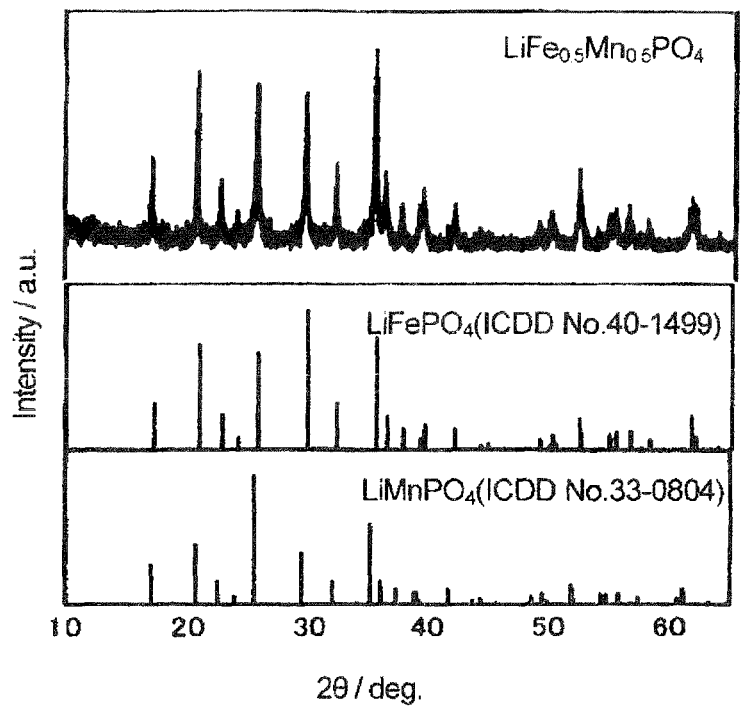
FIG. 8 is the x-ray profile of LiMn$_{0.5}$Fe$_{0.5}$PO$_4$ produced in Preparative Example 5, in this case the product yielded by melting and slow cooling.

Preparation of an LiMn$_{0.5}$Fe$_{0.5}$PO$_4$ Specimen by Melting and Slow Cooling The following starting materials were weighed out and mixed in the stoichiometric ratio in an argon glove box so as to give a total of 10 g: lithium carbonate (Li$_2$CO$_3$, 98%, Wako Pure Chemical Industries, Ltd.) as the lithium source, manganese(II) oxide (MnO, 99.9%, Furuuchi Chemical Corporation) as the manganese source, iron oxide (Fe$_2$O$_3$, reagent first grade, 95.0%, Wako Pure Chemical Industries, Ltd.) as the iron source, and diphosphorus pentoxide (P$_2$O$_5$, 98%, Wako Pure Chemical Industries, Ltd.) as the phosphorus source. After this, and while operating under an argon atmosphere, melting was carried out for 5 minutes at 1500° C. followed by gradual cooling to room temperature at a rate of temperature decline of 200° C./hour. The resulting powder specimen was confirmed to be an orthorhombic Pnma lithium manganese phosphate (ICDD No. 33-0804) single phase from the x-ray diffraction results shown in FIG. 8.

Preparative Example 6

Preparation of an LiFePO$_4$ Powder Specimen by Solid Phase Calcination

The following starting materials were weighed out and mixed in the stoichiometric ratio in an argon glove box so as to give a total of 10 g: lithium carbonate (Li$_2$CO$_3$, 98%, Wako Pure Chemical Industries, Ltd.) as the lithium source, iron oxalate dihydrate (FeC$_2$O$_4$.2H$_2$O, 90%, Wako Pure Chemical Industries, Ltd.) as the iron source, and diammonium hydrogen phosphate ((NH$_4$)$_2$HPO$_4$.4H$_2$O, 99%, Wako Pure Chemical Industries, Ltd.) as the phosphorus source. After this, and while operating in an argon current, calcination was carried out for 48 hours at 800° C. The resulting powder specimen was confirmed to be an orthorhombic Pnma lithium iron phosphate (ICDD No. 40-1499) single phase from the x-ray diffraction results.

Preparative Example 7

Preparation of an LiMn$_{0.6}$Fe$_{0.2}$Ti$_{0.2}$PO$_4$ Specimen by Coprecipitation 100 mL of an aqueous solution containing 0.083 mol iron (III) sulfate (iron(III) sulfate.nH$_2$O, 60 to 80% as Fe$_2$(SO$_4$)$_3$, Wako Pure Chemical Industries, Ltd.) and 0.083 mol titanium (IV) sulfate (30% titanium sulfate solution, 27 to 33%, Wako Pure Chemical Industries, Ltd.) was added to 200 mL of an aqueous solution containing 0.25 mol Mn(CH$_3$COO)$_2$((Mn (CH$_3$COO)$_2$.4H$_2$O) 98 to 102%, Wako Pure Chemical Industries, Ltd.) in a one-liter reactor, and this stirred for 30 minutes at 30° C. To this solution was added 100 mL of an aqueous solution containing 0.47 mol H$_3$PO$_4$ (85% phosphoric acid solution, 85% up, Showa Chemical Corporation) and mixing was carried out for an additional 30 minutes. 400 mL of an aqueous solution containing 1.76 mol LiOH (LiOH.4H$_2$O, 98 to 102%, Wako Pure Chemical Industries, Ltd.) was then added dropwise over 30 minutes, followed by heating to 100° C. and stirring for 1 hour. The pH of the reaction solution that had been cooled to room temperature was 6.7. The resulting coprecipitated product was filtered off, washed with 1 L deionized water, and dried for 12 hours in a 140° C. oven; this was followed by heat treatment for 24 hours at 350° C. in air. The resulting powder specimen was confirmed to be an orthorhombic Pnma lithium manganese phosphate (ICDD No. 33-0804) single phase from the x-ray diffraction results. With regard to the lithium, manganese, iron, titanium, and phosphorus, the results from fluorescent x-ray analysis (ZSX100e fluorescent x-ray analyzer from Rigaku Corporation) and the results from ICP measurements (SPS1500VR ICP emission spectrometer from Seiko Instruments Inc.) confirmed the molar ratio Li:Mn:Fe:Ti:P=1:0.6:0.2:0.2:1 for all specimens within the range of measurement error.

Preparative Example 8

Preparation of an LiMn$_{0.6}$Fe$_{0.2}$Ti$_{0.2}$PO$_4$ Powder Specimen by Processing for 24 Hours with a Planetary Ball Mill The following starting materials were weighed out and mixed in a nitrogen glove box: 0.17 mol lithium carbonate (Li$_2$CO$_3$, 99% up, Kanto Chemical Co., Inc.) as the lithium source, 0.20 mol manganese powder (Mn, 98%, Wako Pure Chemical Industries, Ltd.) as the manganese source, and 0.16 mol diphosphorus pentoxide ($P_2O_5$, 98% up, Kanto Chemical Co., Inc.) as the phosphorus source. The resulting mixture was removed from the glove box and introduced into 250 mL pure water and a reaction was run by stirring for 2 days using a magnetic stirrer. To the resulting suspension were then added 0.067 mol iron citrate ($FeC_6H_5O_7 \cdot nH_2O$, 15 to 20% as Fe, Kanto Chemical Co., Inc.) and 0.067 mol titanium isopropoxide ($Ti[OCH(CH_3)_2]_4$, 95% up, Wako Pure Chemical Industries, Ltd.) while stirring. In order to bring the reaction to completion, processing was carried out for 24 hours with a planetary ball mill (Fritsch, 500-mL stabilized zirconia pot) at 200 rpm. 200 g 5-mm diameter balls and 200 g 10-mm diameter balls were added for stirring with the planetary ball mill. The specimen was dried in a 140° C. drier and was thereafter heat treated for 24 hours at 350° C. in air. The resulting powder specimen was confirmed to be an orthorhombic Pnma lithium manganese phosphate (ICDD No. 33-0804) single phase from the x-ray diffraction results. With regard to the lithium, manganese, iron, titanium, and phosphorus, the results from fluorescent x-ray analysis (ZSX100e fluorescent x-ray analyzer from Rigaku Corporation) and the results from ICP measurements (SPS1500VR ICP emission spectrometer from Seiko Instruments Inc.) confirmed Li:Mn:Fe:Ti:P=1:0.6:0.2:0.2:1 for all specimens within the range of measurement error.

Preparative Example 9

Preparation of an $LiMn_{0.6}Co_{0.2}Ti_{0.2}PO_4$ Powder Specimen by Processing for 24 Hours with a Planetary Ball Mill The following starting materials were weighed out and mixed in a nitrogen glove box: 0.17 mol lithium carbonate ($Li_2CO_3$, 99% up, Kanto Chemical Co., Inc.) as the lithium source, 0.20 mol manganese powder (Mn, 98%, Wako Pure Chemical Industries, Ltd.) as the manganese source, and 0.16 mol diphosphorus pentoxide ($P_2O_5$, 98% up, Kanto Chemical Co., Inc.) as the phosphorus source. The resulting mixture was removed from the glove box and introduced into 250 mL pure water and a reaction was run by stirring for 2 days using a magnetic stirrer. To the resulting suspension were then added 0.067 mol cobalt acetate ($Co(CH_3COO)_2 \cdot 4H_2O$, 99% up, Wako Pure Chemical Industries, Ltd.) and 0.067 mol titanium Isopropoxide ($Ti[OCH(CH_3)_2]_4$, 95% up, Wako Pure Chemical Industries, Ltd.) while stirring. In order to bring the reaction to completion, processing was carried out for 24 hours with a planetary ball mill (Fritsch, 500-mL partially stabilized zirconia pot) at 200 rpm. 200 g 5-mm diameter balls and 200 g 10-mm diameter balls were added for stirring with the planetary ball mill. The specimen was dried in a 140° C. drier and was thereafter heat treated for 24 hours at 350° C. in air. The resulting powder specimen was confirmed to be an orthorhombic Pnma lithium manganese phosphate (ICDD No. 33-0804) single phase from the x-ray diffraction results. With regard to the lithium, manganese, cobalt, titanium, and phosphorus, the results from fluorescent x-ray analysis (ZSX100e fluorescent x-ray analyzer from Rigaku Corporation) and the results from ICP measurements (SPS1500VR ICP emission spectrometer from Seiko Instruments Inc.) confirmed the molar ratio Li:Mn:Co:Ti:P=1:0.6:0.2:0.2:1 for all specimens within the range of measurement error.

Preparative Example 10

Preparation of an $LiMn_{0.8}Fe_{0.1}Ti_{0.1}PO_4$ Powder Specimen by Processing for 24 Hours with a Planetary Ball Mill The following starting materials were weighed out and mixed in a nitrogen glove box: 0.17 mol lithium carbonate ($Li_2CO_3$, 99% up, Kanto Chemical Co., Inc.) as the lithium source, 0.25 mol manganese powder (Mn, 98%, Wako Pure Chemical Industries, Ltd.) as the manganese source, and 0.16 mol diphosphorus pentoxide ($P_2O_5$, 98% up, Kanto Chemical Co., Inc.) as the phosphorus source. The resulting mixture was removed from the glove box and introduced into 250 mL pure water and a reaction was run by stirring for 2 days using a magnetic stirrer. To the resulting suspension were then added 0.031 mol iron citrate ($FeC_6H_5O_7 \cdot nH_2O$, 15 to 20% as Fe, Kanto Chemical Co., Inc.) and 0.031 mol titanium isopropoxide ($Ti[OCH(CH_3)_2]_4$, 95% up, Wako Pure Chemical Industries, Ltd.) while stirring. In order to bring the reaction to completion, processing was carried out for 24 hours with a planetary ball mill (Fritsch, 500-mL partially stabilized zirconia pot) at 200 rpm. 200 g 5-mm diameter balls and 200 g 10-mm diameter balls were added for stirring with the planetary ball mill. The specimen was dried in a 140° C. drier and was thereafter heat treated for 24 hours at 350° C. in air. The resulting powder specimen was confirmed to be an orthorhombic Pnma lithium manganese phosphate (ICDD No. 33-0804) single phase from the x-ray diffraction results. With regard to the lithium, manganese, iron, titanium, and phosphorus, the results from fluorescent x-ray analysis (ZSX100e fluorescent x-ray analyzer from Rigaku Corporation) and the results from ICP measurements (SPS1500VR ICP emission spectrometer from Seiko Instruments Inc.) confirmed the molar ratio Li:Mn:Fe:Ti:P=1:0.8:0.1:0.1:1 for all specimens within the range of measurement error.

Production Example 1

Production of Positive Electrode Pellets

Figure 9:
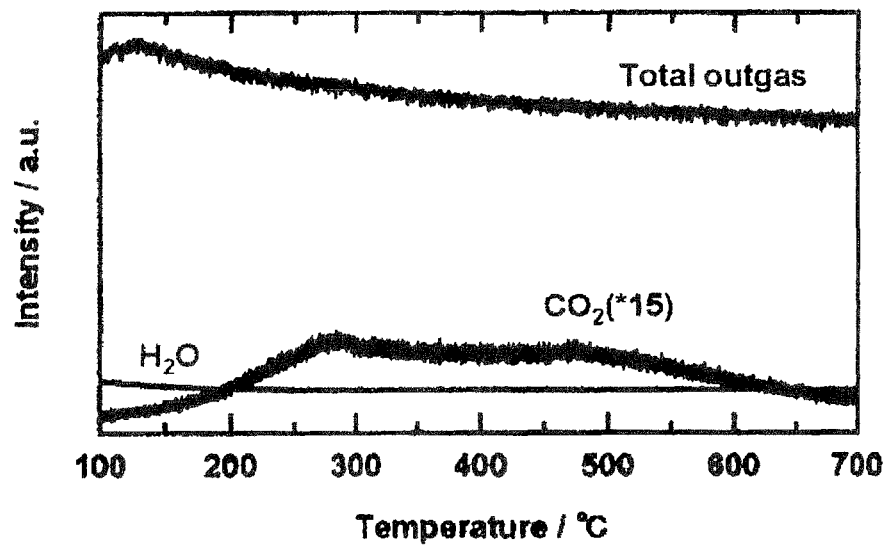
FIG. 9 is a TG-MS profile that shows suitable annealing conditions in Production Example 1.
Figure 10A:
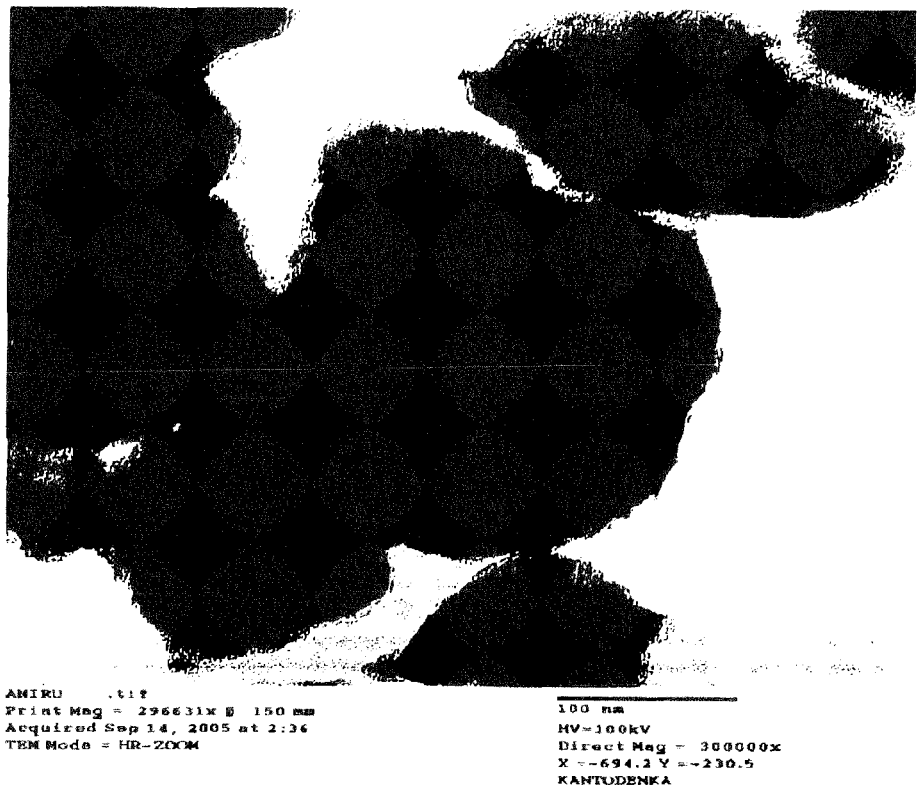
FIG. 10a is a TEM photograph, taken prior to annealing under argon for 1 hour at 500° C., of LiMnPO$_4$ produced in Preparative Example 3, i.e., the solid phase calcination product.
Figure 10B:
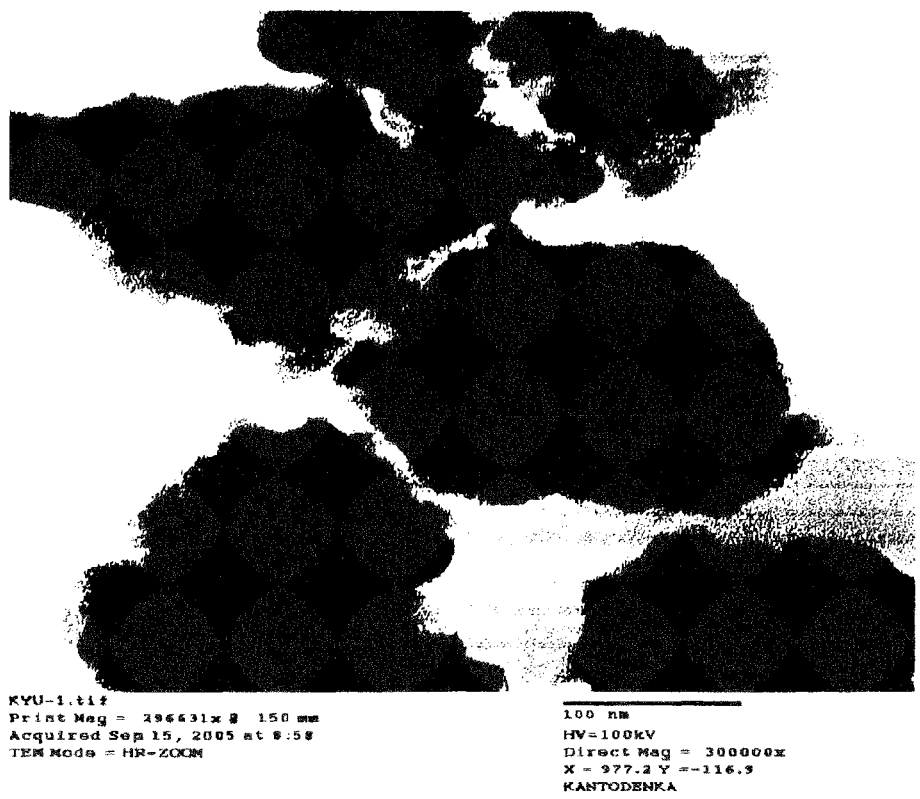
FIG. 10b is a TEM photograph, taken after annealing under argon for 1 hour at 500° C., of LiMnPO$_4$ produced in Preparative Example 3, i.e., the solid phase calcination product.

Positive electrode pellets were produced from each of the powder specimens of Preparative Examples 1 to 10 using the following procedure. Two 20-mm diameter balls, four 15-mm diameter balls, fifteen 10-mm diameter balls, and sufficient 3-mm diameter balls to bring the total to 175 g were introduced into a planetary rotary ball mill (LP-4/2 from Ito Manufacturing) and 2.5 g of a powder specimen from Preparative Examples 1 to 10 and 0.89 g (weight ratio=70:25) acetylene black (Denka Black, 50% press grade, Denki Kagaku Kogyou Kabushiki Kaisha) were additionally introduced. This mixture was dry-mixed for 24 hours at 200 rpm. An 80-mL partially stabilized zirconia pot was used in the ball mill. Then, in order to further raise the electroconductivity of the specimen, heat treatment was carried out for 1 hour at 500° C. in an argon atmosphere. The TG-MS spectrum shown in FIG. 9 was obtained by analysis of the generated gas at each annealing temperature when the $LiMnPO_4$ specimen from Preparative Example 3 (solid phase calcination) was coated with carbon using a planetary ball mill under the instant conditions and then annealed in an inert gas. It may be understood from this diagram that very suitable annealing temperature conditions, at which the added carbon takes up oxygen from the surface of the positive electrode specimen and begins to be volatilized as carbon dioxide (molecular weight=44), are 250 to 500° C. and above. In addition, TEM photographs are shown in FIGS. 10a and 10b for the LiMnPO$_4$ specimen from Preparative Example 3 (solid phase calcination) before and after, respectively, an argon annealing treatment for 1 hour at 500° C., which were the optimal annealing conditions obtained in this case.

The resulting heat-treated specimen was weighed out with polytetrafluoroethylene (PTFE) as binder so as to obtain a weight ratio of 95:5; this was mixed and kneaded and molded into a 0.7 mm-thick sheet; and a positive electrode pellet was made by punching this into a diameter of 10 mmφ. A molar ratio Li:Mn:P=1:1:1 was confirmed by ICP measurement (measurement carried out using a 750° C. from Agilent) for all specimens within the range of measurement error.

Production Example 2

Coin Cell Fabrication

Figure 11:
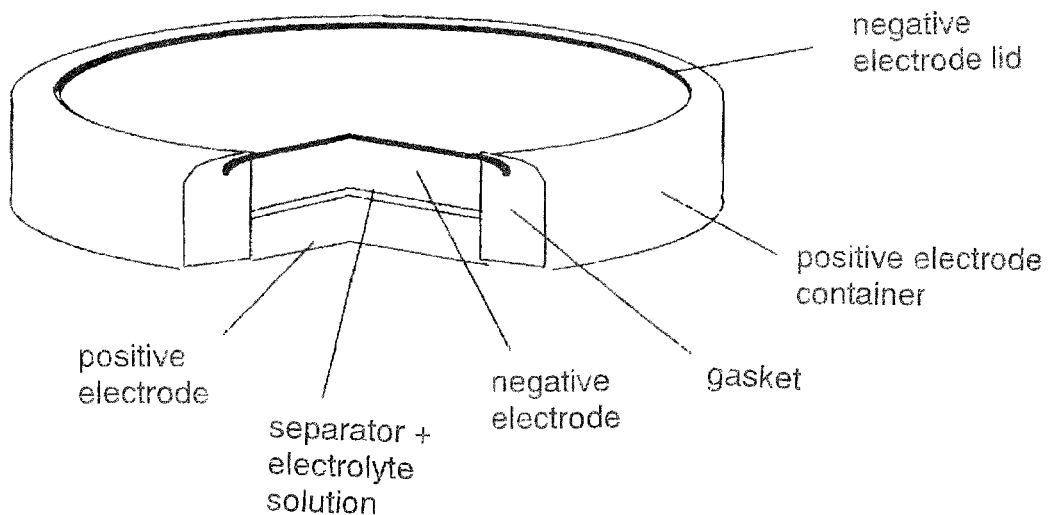
FIG. 11 is a diagram of the structure of a coin cell fabricated in Example 1.

Coin cells were fabricated using the aforementioned positive electrode pellets produced from the powder specimens of Preparative Examples 1 to 10. Lithium foil with a diameter of 1.5 mm and a thickness of 0.15 mm was used as the counter-electrode to the positive electrode pellet. Porous polyethylene sheet with a diameter of 22 mm and a thickness of 0.02 mm was used as the separator. The nonaqueous electrolyte solution was used that was prepared by dissolving LiPF$_6$ to a concentration of approximately 1 mol/liter in a mixed solvent of ethylene carbonate (EC) and dimethyl carbonate (DMC) mixed at a 1:1 volumetric ratio. These constituent elements were mounted in a stainless steel positive electrode container and negative electrode lid and sealed with a gasket to fabricate the coin-shaped cell shown in FIG. 11 (thickness=2 mm, diameter=32 mm, 2032 configuration) to be used for measurement purposes. The battery assembly sequence was carried out in a dry box that had a dew point no greater than −90° C. and that was equipped with an argon purifier.

Example 1

Figure 12:
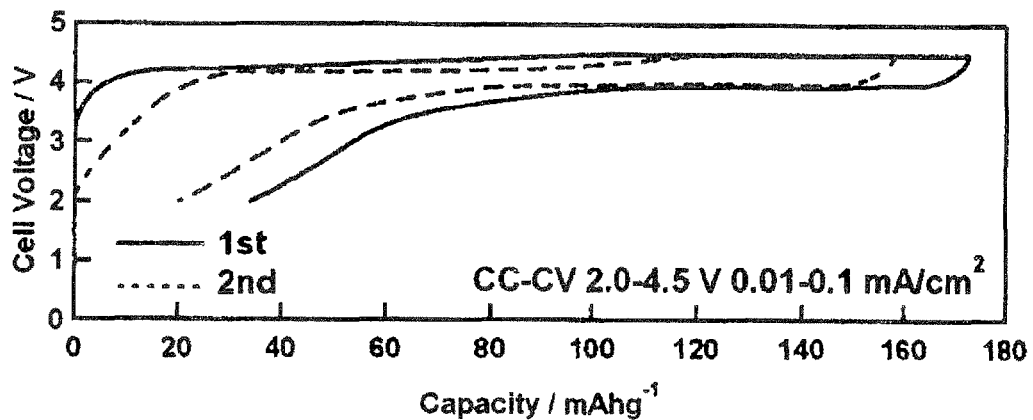
FIG. 12 is the charge-discharge profile during the first and second cycles at room temperature for LiMnPO$_4$ produced in Example 1, in this case the article yielded by argon annealing treatment of the positive electrode yielded by a planetary ball mill wet-type low-temperature synthesis with heat treatment at 350° C.
Figure 13:
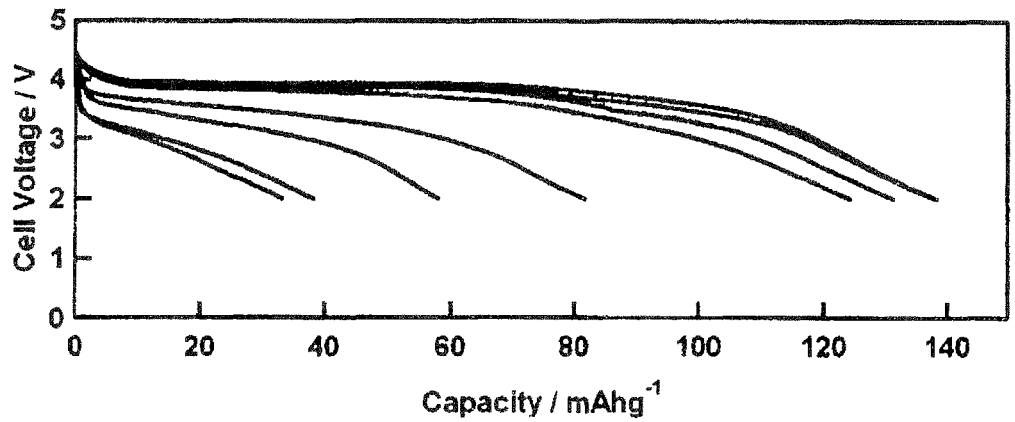
FIG. 13 is the discharge profile at room temperature at various discharge current densities (in sequence from the right: 0.1, 0.2, 0.5, 1.0, 2.0, 3.0, 4.0, 5.0 mA/cm$^2$) for LiMnPO$_4$ produced in Example 1, in this case the article yielded by argon annealing treatment of the positive electrode yielded by a planetary ball mill wet-type low-temperature synthesis with heat treatment at 350° C.
Figure 14:
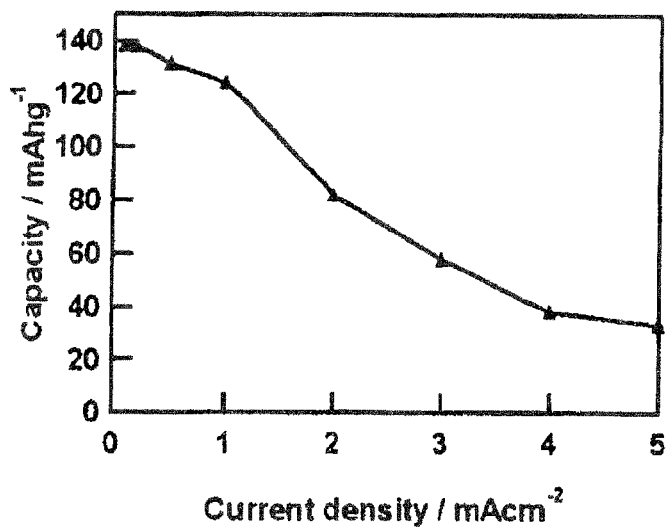
FIG. 14 shows the rate characteristic at room temperature for LiMnPO$_4$ produced in Example 1, in this case the article yielded by argon annealing treatment of the positive electrode yielded by a planetary ball mill wet-type low-temperature synthesis with heat treatment at 350° C.
Figure 15:
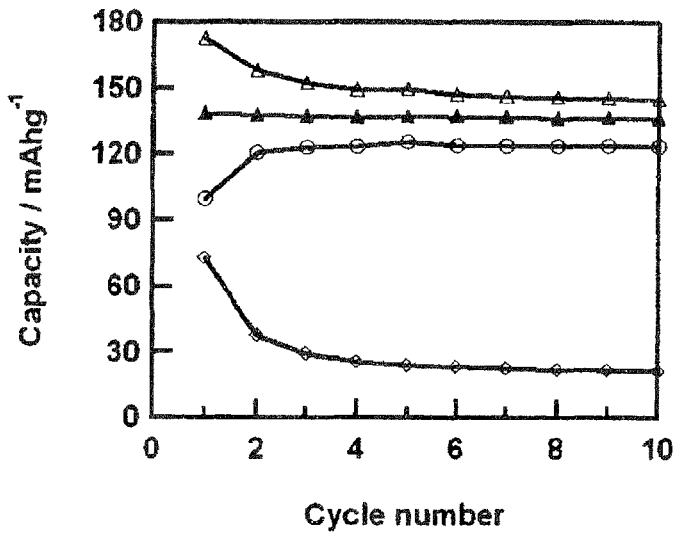
FIG. 15 shows the cycle characteristics at room temperature for LiMnPO$_4$ produced in Example 1, in this case the article yielded by argon annealing treatment of the positive electrode yielded by a planetary ball mill wet-type low-temperature synthesis with heat treatment at 350° C.; (Δ: total charge capacity, ○: charge capacity at CC, ◊: charge capacity at CV, ▲: discharge capacity)

Measurement of battery characteristics:
A charge-discharge profile is shown in FIG. 12 for 2.0 to 4.5 V CCCV (charging termination in constant voltage mode at 0.01 mA/cm$^2$) voltage regulation and a 0.1 mA/cm$^2$ charge-discharge rate, for a coin cell fabricated by the method of Production Example 2 from the positive electrode pellet produced by the method of Production Example 1 from LiMnPO$_4$ (heat treated at 350° C.) of Preparative Example 1. The initial discharge profile is shown in FIG. 13 at the individual discharge current densities for different discharge current densities in the range from 0.1 to 5.0 mA/cm$^2$. In the figure, the discharge profile is shown for 0.1, 0.2, 0.5, 1.0, 2.0, 3.0, 4.0, and 5.0 mA/cm$^2$ in sequence from the right. These results are arranged in FIG. 14 as the rate characteristic. A charge-discharge profile is also shown for this coin cell in FIG. 15 for 2.0 to 4.5 V CCCV (charging termination in constant voltage mode at 0.01 mA/cm$^2$) voltage regulation and a 0.1 mA/cm$^2$ charge-discharge rate. In this figure, Δ shows the overall charge capacity; ○ shows the charge capacity in CC constant current mode; ◇ shows the charge capacity in CV constant voltage mode; and ▲ shows the discharge capacity. The charge capacity in CV constant voltage mode (shown by ◇) gradually declines as cycling progresses, which suggests an improved electroconductivity for the positive electrode.

Comparative Example 1

A positive electrode pellet was produced as in Production Example 1, but in this case without carrying out the heat treatment for 1 hour at 500° C. in an argon atmosphere after the acetylene black had been mixed with the LiMnPO$_4$ (heat treated at 350° C.) of Preparative Example 1.

Figure 16:
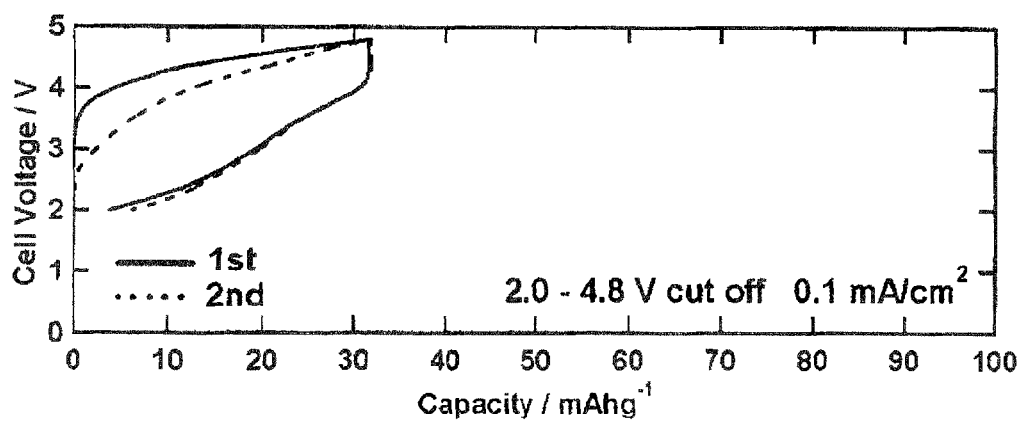
FIG. 16 shows the charge-discharge profile at room temperature for the first and second cycles for LiMnPO$_4$ produced in Comparative Example 1, in this case the article yielded by omitting the argon annealing treatment of the positive electrode yielded by a planetary ball mill wet-type low-temperature synthesis with heat treatment at 350° C.

A charge-discharge profile is shown in FIG. 16 for 2.0 to 4.8 V voltage regulation and a 0.1 mA/cm$^2$ charge-discharge rate for a positive electrode, prepared as in Production Example 2 using the aforementioned comparison positive electrode pellet, of LiMnPO$_4$ obtained by a planetary ball mill wet-type low-temperature synthesis with heat treatment at 350° C.

A comparison of the results of Example 1 and FIG. 12 with the results of Comparative Example 1 and FIG. 16 shows that, for LiMnPO$_4$ heat treated at the same 350° C. and dry-mixed in a planetary ball mill with the same amount of acetylene black, a substantial difference occurs in the positive electrode utilization rate and discharge rate characteristic depending on whether the ensuing heat treatment for 1 hour at 500° C. in an argon atmosphere was carried out prior to positive electrode pellet production.

Example 2a

Figure 17:
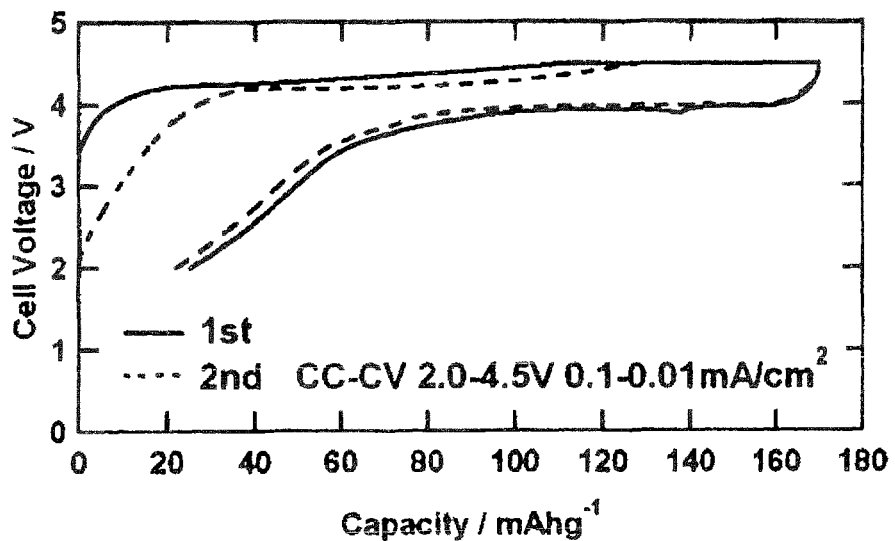
FIG. 17 shows the charge-discharge profile at room temperature for the first and second cycles for the article produced in Example 2a, in this case by argon annealing treatment of the positive electrode of LiMnPO$_4$ synthesized by the solid phase calcination method of Preparative Example 3.
Figure 18:
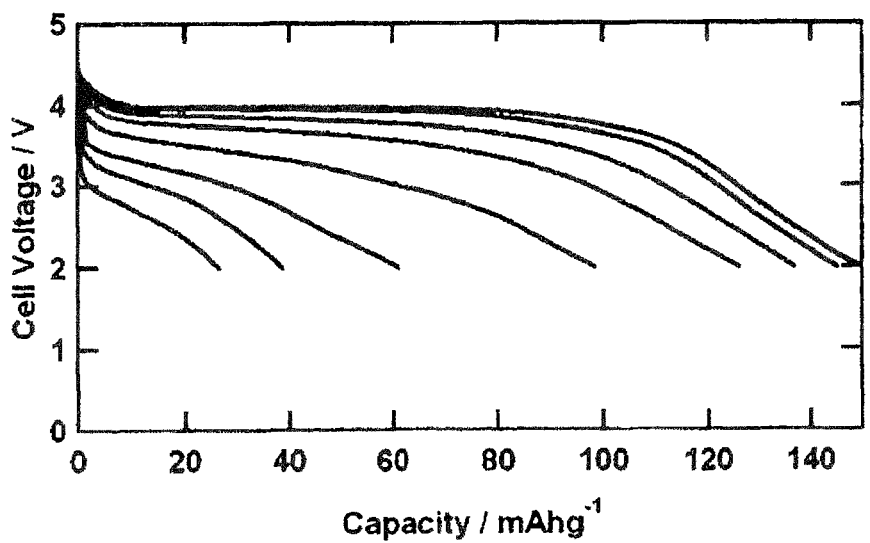
FIG. 18 shows the discharge profile at room temperature at various discharge current densities (in sequence from the right: 0.1, 0.2, 0.5, 1.0, 2.0, 3.0, 4.0, 5.0 mA/cm$^2$) for the article produced in Example 2a, in this case by argon annealing treatment of the positive electrode of LiMnPO$_4$ synthesized by the solid phase calcination method of Preparative Example 3.

Measurement of battery characteristics:
A charge-discharge profile is shown in FIG. 17 for 2.0 to 4.5 V CCCV (charging termination in constant voltage mode at 0.01 mA/cm$^2$) voltage regulation and a 0.1 mA/cm$^2$ charge-discharge rate, for a coin cell fabricated by the method of Production Example 2 from the positive electrode pellet produced by the method of Production Example 1 from the LiMnPO$_4$ (synthesized by solid phase calcination) of Preparative Example 3. The initial discharge profile is shown in FIG. 18 for different discharge current densities in the range from 0.1 to 5.0 mA/cm$^2$. In the figure, the discharge profile is shown for 0.1, 0.2, 0.5, 1.0, 2.0, 3.0, 4.0, and 5.0 mA/cm$^2$ in sequence from the right.

Example 2b

A positive electrode pellet was produced as in Example 2a, but in this case by carrying out a heat treatment in nitrogen gas for 1 hour at 500° C., rather than in argon for 1 hour at 500° C., after the acetylene black had been mixed with the LiMnPO$_4$ (synthesized by solid phase calcination) of Preparative Example 3.

Figure 19:
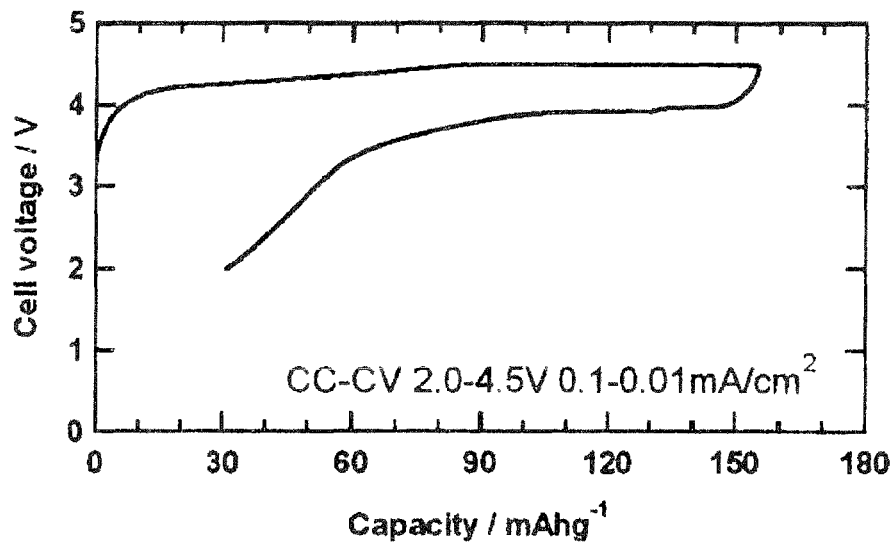
FIG. 19 shows the charge-discharge profile at room temperature for the first and second cycles for the article produced in Example 2b, in this case by nitrogen annealing treatment of the positive electrode of LiMnPO$_4$ synthesized by the solid phase calcination method of Preparative Example 3.

A charge-discharge profile is shown in FIG. 19 for 2.0 to 4.5 V CCCV (charging termination in constant voltage mode at 0.01 mA/cm$^2$) voltage regulation and a 0.1 mA/cm$^2$ charge-discharge rate, for a coin cell fabricated as in Example 2a using this comparison positive electrode pellet.

Comparative Example 2

A positive electrode pellet was produced as in Example 2a, but in this case without carrying out the heat treatment for 1 hour at 500° C. in an argon atmosphere after the acetylene black had been mixed with the LiMnPO$_4$ (synthesized by solid phase calcination) of Preparative Example 3.

Figure 20:
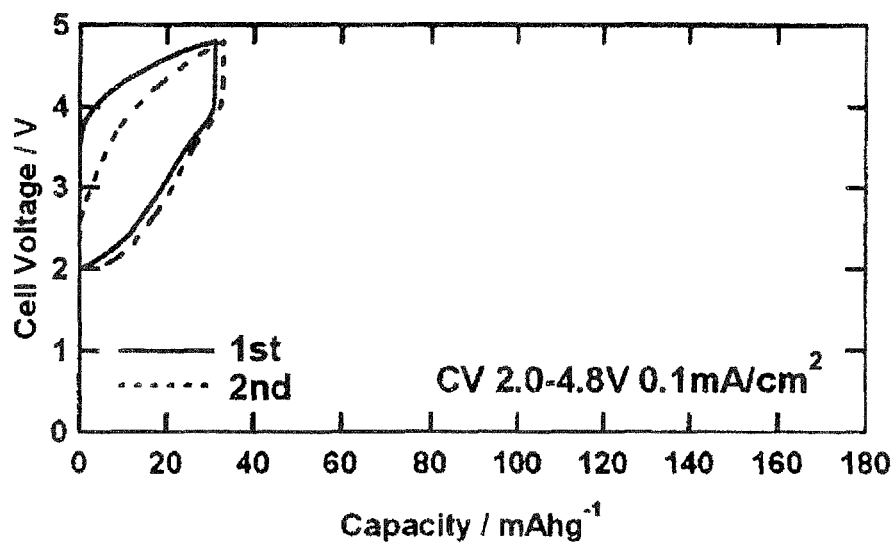
FIG. 20 shows the charge-discharge profile at room temperature for the first and second cycles for the article produced in Comparative Example 2, in this case by omitting the argon annealing treatment of the positive electrode of LiMnPO$_4$ synthesized by the solid phase calcination method of Preparative Example 3.

A charge-discharge profile is shown in FIG. 20 for 2.0 to 4.8 V voltage regulation and a 0.1 mA/cm$^2$ charge-discharge rate, for a coin cell fabricated as in Example 2a using this comparison positive electrode pellet.

Figure 21:
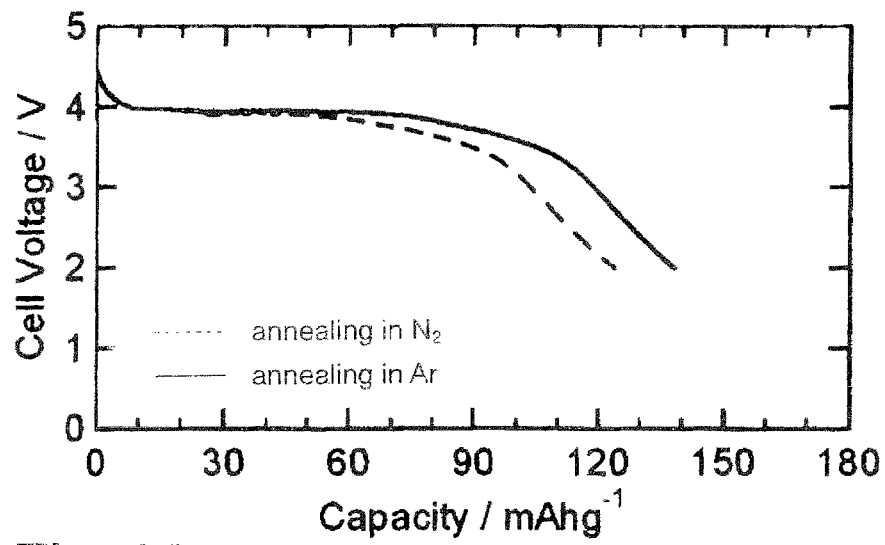
FIG. 21 shows a comparison of the initial discharge profiles at room temperature of the articles produced in Example 2a and Example 2b, in this case by argon annealing treatment or nitrogen annealing treatment of the positive electrode of LiMnPO$_4$ synthesized by the solid phase calcination method of Preparative Example 3.

A comparison of FIGS. 17, 19, and 20 shows that an argon anneal or a nitrogen gas anneal also provides a substantial improvement in the electroconductivity of the positive electrode for the case of LiMnPO$_4$ synthesized by solid phase calcination. It may be understood from the comparison of Example 2a with Example 2b shown in FIG. 21 that, among inert gases, an argon atmosphere is a better annealing atmosphere than a nitrogen atmosphere.

Example 3

Figure 22:
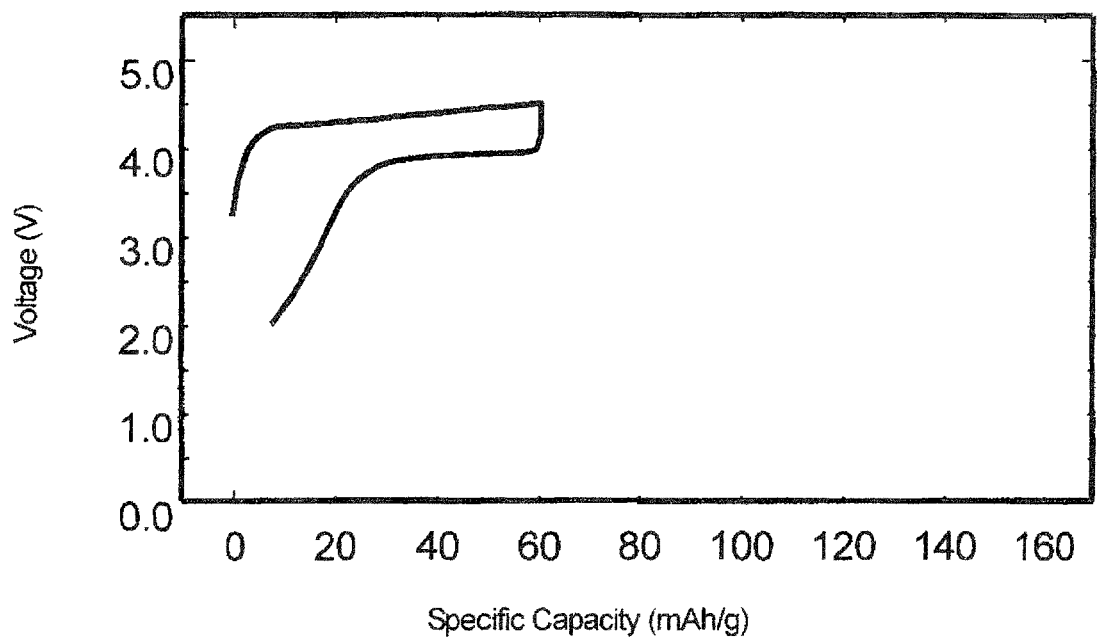
FIG. 22 shows the charge-discharge profile at room temperature of the first and second cycles for the article produced in Example 3, in this case by argon annealing treatment of the positive electrode of LiMnPO$_4$ synthesized by the melting/slow cooling method of Preparative Example 4.

Measurement of battery characteristics:

A charge-discharge profile at 25° C. is shown in FIG. 22 for 2.0 to 4.5 V CV voltage regulation and a 0.1 mA/cm² charge-discharge rate, for a coin cell fabricated by the method of Production Example 2 from the positive electrode pellet produced by the method of Production Example 1 from the $LiMnPO_4$ (synthesized by melting+slow cooling) of Preparative Example 4.

Comparative Example 3

A positive electrode pellet was produced as in Example 3, but in this case without carrying out the heat treatment for 1 hour at 500° C. in an argon atmosphere after the acetylene black had been mixed with the $LiMnPO_4$ (synthesized by melting+slow cooling) of Preparative Example 4.

Figure 23:
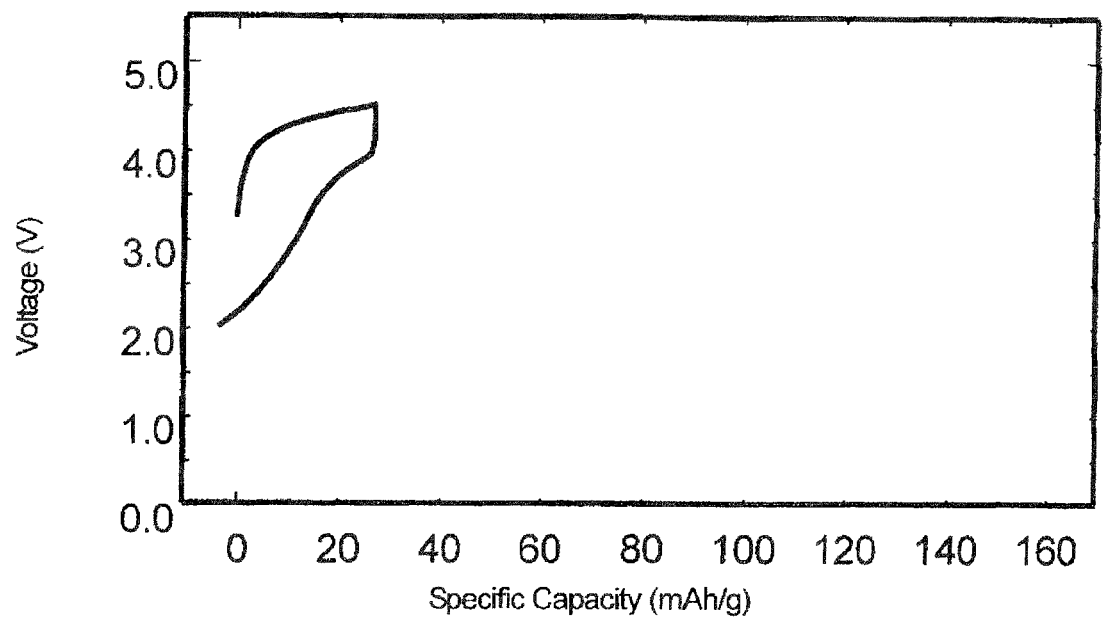
FIG. 23 shows the charge-discharge profile at room temperature of the first and second cycles for the article produced in Comparative Example 3, in this case by omitting the argon annealing treatment of the positive electrode of LiMnPO$_4$ synthesized by the melting/slow cooling method of Preparative Example 4.

A charge-discharge profile at 25° C. is shown in FIG. 23 for 2.0 to 4.5 V voltage regulation and a 0.1 mA/cm² charge-discharge rate, for a coin cell fabricated as in Example 3 using this comparison positive electrode pellet.

A comparison of FIGS. 22 and 23 shows that the argon anneal also provides a substantial improvement in the electroconductivity of the positive electrode for the case of $LiMnPO_4$ synthesized by melting+slow cooling.

Example 4

Figure 24:
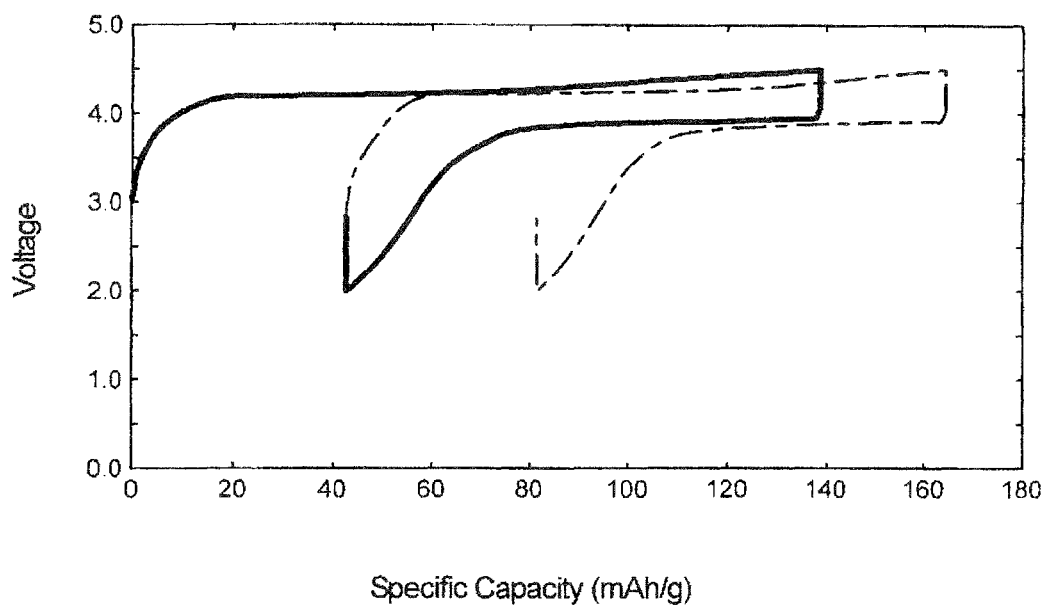
FIG. 24 shows the charge-discharge profile at 60° C. of the first and second cycles for the article produced in Example 4, in this case by argon annealing treatment of the positive electrode of LiMnPO$_4$ synthesized by the melting/slow cooling method of Preparative Example 4.

Measurement of battery characteristics:

A charge-discharge profile at 60° C. is shown in FIG. 24 for 2.0 to 4.5 V CV voltage regulation and a 0.1 mA/cm² charge-discharge rate, for a coin cell fabricated by the method of Production Example 2 using the positive electrode pellet produced by the method of Production Example 1 from the $LiMnPO_4$ (synthesized by melting+slow cooling) of Preparative Example 4.

Comparative Example 4

A positive electrode pellet was produced as in Example 4, but in this case without carrying out the heat treatment for 1 hour at 500° C. in an argon atmosphere after the acetylene black had been mixed with the $LiMnPO_4$ (synthesized by melting+slow cooling) of Preparative Example 4.

Figure 25:
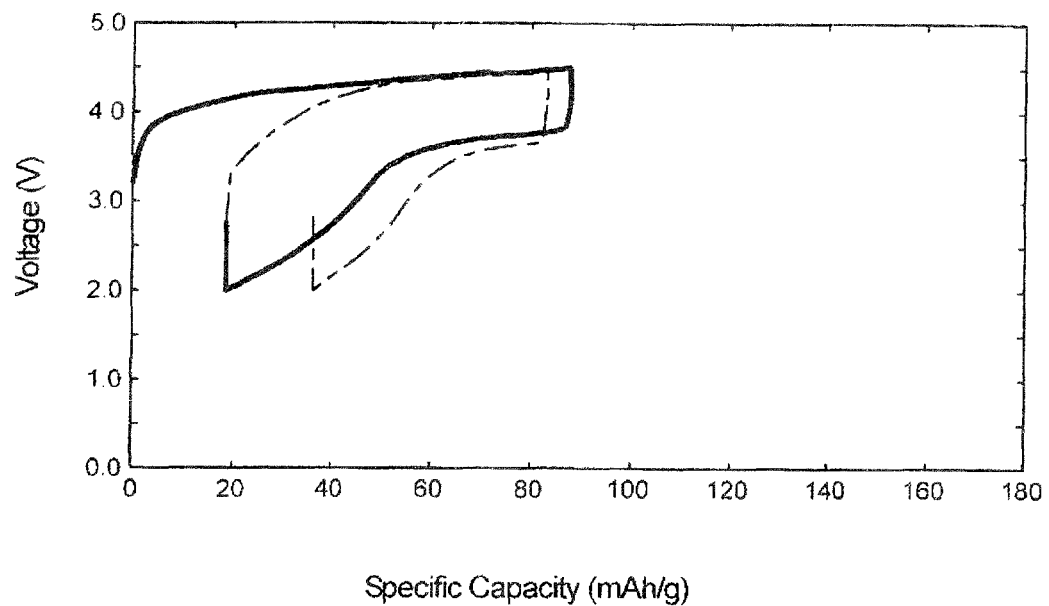
FIG. 25 shows the charge-discharge profile at 60° C. of the first and second cycles of the article produced in Comparative Example 4, in this case by omitting the argon annealing treatment of the positive electrode of LiMnPO$_4$ synthesized by the melting/slow cooling method of Preparative Example 4.

A charge-discharge profile at 60° C. is shown in FIG. 25 for 2.0 to 4.5 V voltage regulation and a 0.1 mA/cm² charge-discharge rate, for a coin cell fabricated as in Example 4 using this comparison positive electrode pellet.

A comparison of FIGS. 24 and 25 shows that the argon anneal also provides a substantial improvement in the electroconductivity of the positive electrode even in a high-temperature cycle at 60° C. for the case of $LiMnPO_4$ synthesized by melting+slow cooling.

Example 5

Figure 26:
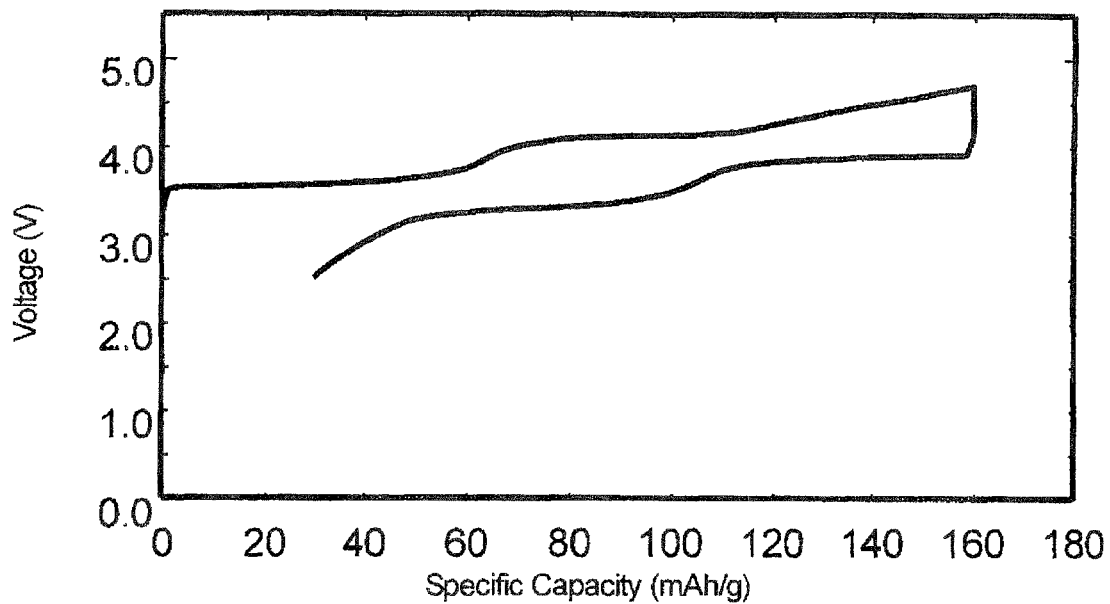
FIG. 26 shows the charge-discharge profile at room temperature of the first and second cycles for the article produced in Example 5, in this case by argon annealing treatment of the positive electrode of LiMn$_{0.5}$Fe$_{0.5}$PO$_4$ synthesized by the melting/slow cooling method of Preparative Example 5.

Measurement of battery characteristics:

A charge-discharge profile at 25° C. is shown in FIG. 26 for 2.5 to 5.0 V CV voltage regulation and a 0.1 mA/cm² charge-discharge rate, for a coin cell fabricated by the method of Production Example 2 using the positive electrode pellet produced by the method of Production Example 1 from the $LiMn_{0.5}Fe_{0.5}PO_4$ (synthesized by melting+slow cooling) of Preparative Example 5.

Comparative Example 5

A positive electrode pellet was produced as in Example 5, but in this case without carrying out the heat treatment for 1 hour at 500° C. in an argon atmosphere after the acetylene black had been mixed with the $LiMn_{0.5}Fe_{0.5}PO_4$ (synthesized by melting+slow cooling) of Preparative Example 5.

Figure 27:
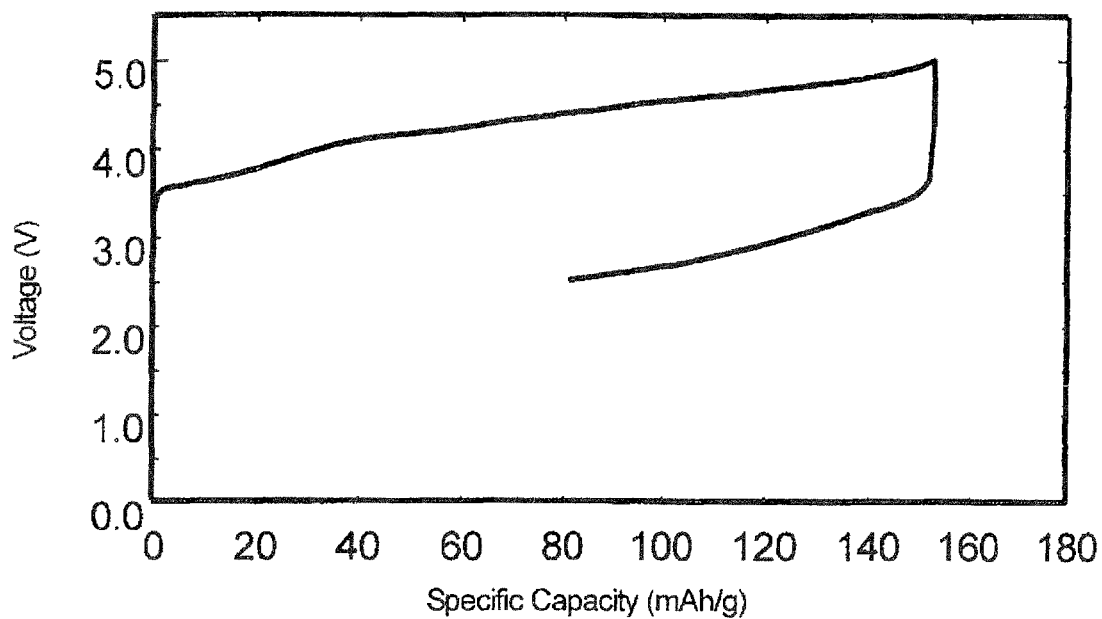
FIG. 27 shows the charge-discharge profile at room temperature of the first and second cycles for the article produced in Comparative Example 5, in this case by omitting the argon annealing treatment of the positive electrode of LiMn$_{0.5}$Fe$_{0.5}$PO$_4$ synthesized by the melting/slow cooling method of Preparative Example 5.

A charge-discharge profile at 25° C. is shown in FIG. 27 for 2.5 to 5.0 V voltage regulation and a 0.1 mA/cm² charge-discharge rate, for a coin cell fabricated as in Example 5 using this comparison positive electrode pellet.

A comparison of FIGS. 26 and 27 shows that the argon anneal also provides a substantial improvement in the electroconductivity of the positive electrode for the case of a solid solution such as $LiMn_{0.5}Fe_{0.5}PO_4$.

Comparative Example 6

Figure 28:
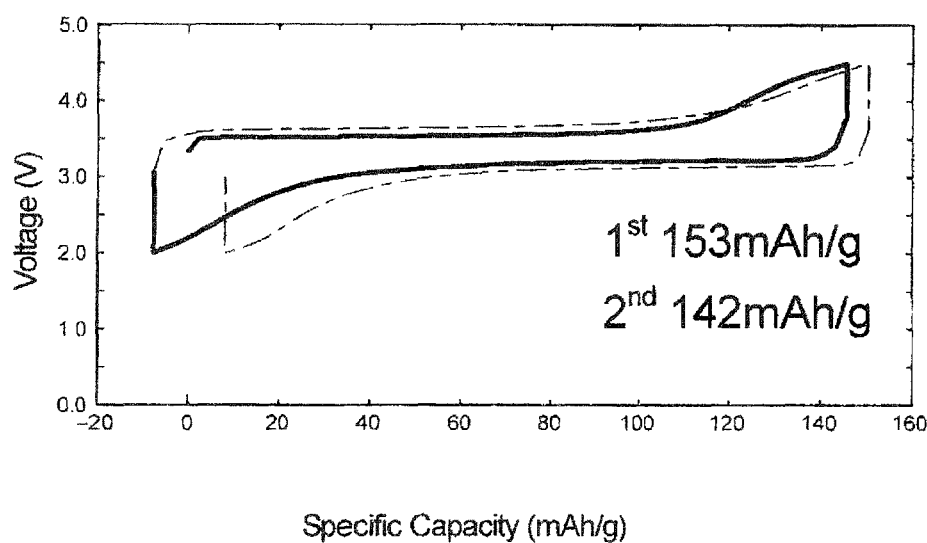
FIG. 28 shows the charge-discharge profile at 60° C. of the first and second cycles for the article produced in Comparative Example 6, in this case by argon annealing treatment of the positive electrode of LiFePO$_4$ synthesized by the solid phase calcination method of Preparative Example 6.

Measurement of battery characteristics:

A charge-discharge profile at 25° C. is shown in FIG. 28 for 2.0 to 4.5 V CV voltage regulation and a 0.2 mA/cm² charge-discharge rate, for a coin cell fabricated by the method of Production Example 2 using the positive electrode pellet produced by the method of Production Example 1 from the $LiFePO_4$ (synthesized by solid phase calcination) of Preparative Example 6.

Comparative Example 7

A positive electrode pellet was produced as in Comparative Example 6, but in this case without carrying out the heat treatment for 1 hour at 500° C. in an argon atmosphere after the acetylene black had been mixed with the $LiFePO_4$ (synthesized by solid phase calcination) of Preparative Example 6.

Figure 29:
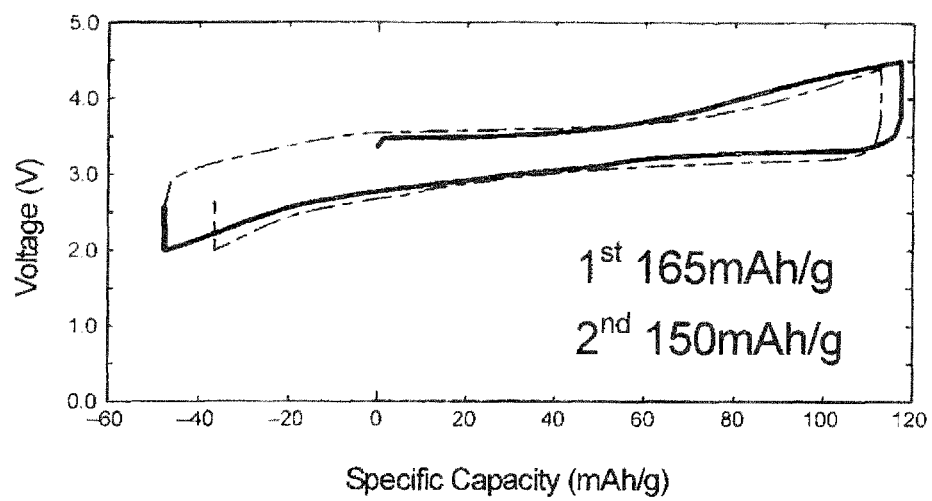
FIG. 29 shows the charge-discharge profile at 60° C. of the first and second cycles for the article produced in Comparative Example 7, in this case by omitting the argon annealing treatment of the positive electrode of LiFePO$_4$ synthesized by the solid phase calcination method of Preparative Example 6.

A charge-discharge profile at 25° C. is shown in FIG. 29 for 2.0 to 4.5 V CV voltage regulation and a 0.2 mA/cm² charge-discharge rate, for a coin cell fabricated as in Comparative Example 6 using this comparison positive electrode pellet.

A comparison of FIGS. 28 and 29 shows that almost no effect from the argon anneal is seen for an $LiFePO_4$ positive electrode that lacks an $LiMnPO_4$ solid solution component.

Example 6

Figure 31:
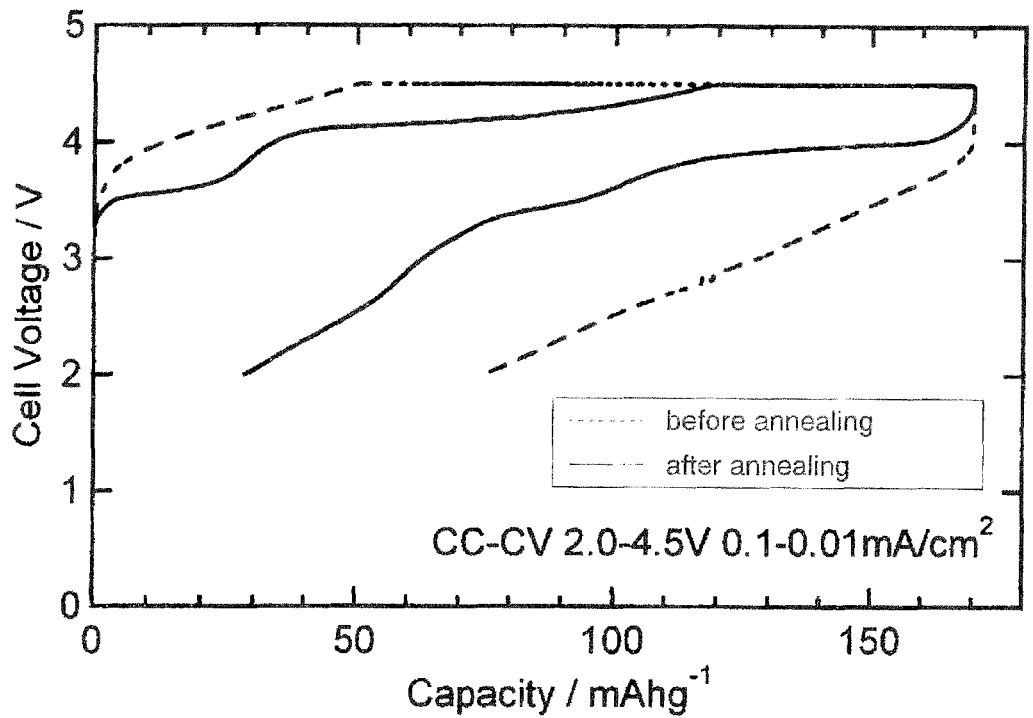
FIG. 31 is a diagram that compares the initial charge-discharge profiles of Example 6 and Comparative Example 8.

Measurement of battery characteristics:

A charge-discharge profile at 25° C. is shown by the solid line in FIG. 31 for 2.0 to 4.5 V CV voltage regulation and a 0.1 mA/cm² charge-discharge rate, for a coin cell fabricated by the method of Production Example 2 using the positive electrode pellet produced by the method of Production Example 1 from the $LiMn_{0.6}Fe_{0.2}Ti_{0.2}PO_4$ (synthesized by coprecipitation) of Preparative Example 7.

Comparative Example 8

A positive electrode pellet was produced as in Example 6, but in this case without carrying out the heat treatment for 1 hour at 500° C. in an argon atmosphere after the acetylene black had been mixed with the $LiMn_{0.6}Fe_{0.2}Ti_{0.2}PO_4$ (synthesized by coprecipitation) of Preparative Example 7.

A charge-discharge profile at 25° C. is shown by the dashed line in FIG. 31 for 2.0 to 4.5 V voltage regulation and a 0.1 mA/cm² charge-discharge rate, for a coin cell fabricated as in Example 6 using this comparison positive electrode pellet.

As may be understood from the results in FIG. 31, the argon anneal also provides a substantial improvement in the electroconductivity of the positive electrode in the case of the $LiMn_{0.6}Fe_{0.2}Ti_{0.2}PO_4$ powder specimen prepared by doping with Fe and Ti by coprecipitation.

Example 7

Figure 32:
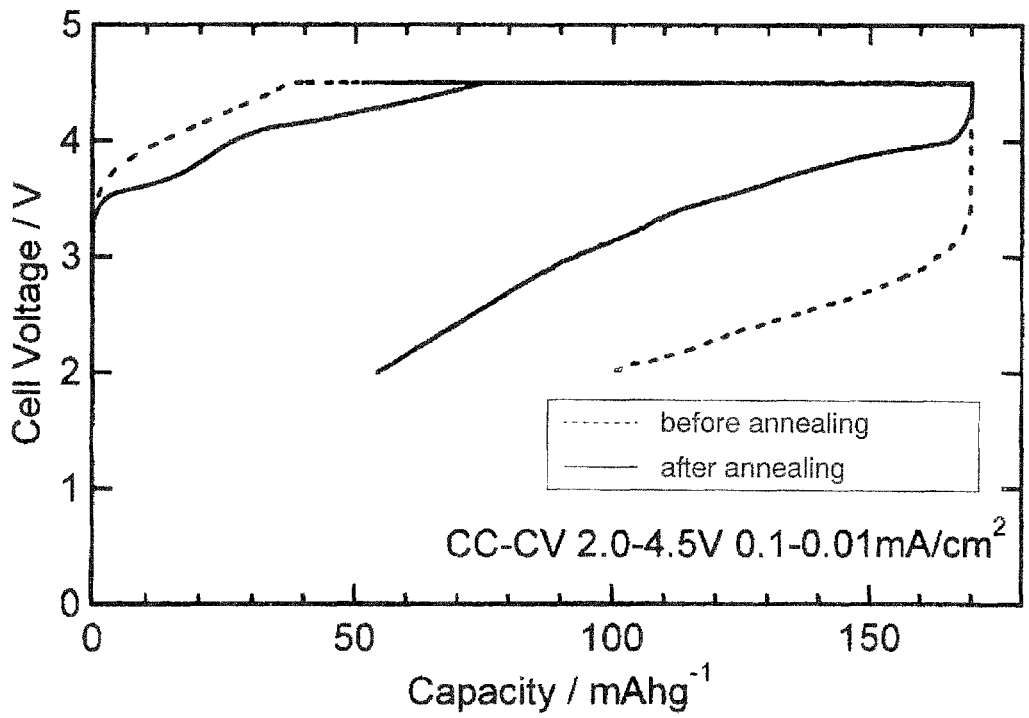
FIG. 32 is a diagram that compares the initial charge-discharge profiles of Example 7 and Comparative Example 9.

Measurement of battery characteristics:

A charge-discharge profile is shown by the solid line in FIG. 32 for 2.0 to 4.5 V CV voltage regulation and a 0.1 mA/cm² charge-discharge rate, for a coin cell fabricated by the method of Production Example 2 using the positive electrode pellet produced by the method of Production Example 1 from the $LiMn_{0.6}Fe_{0.2}Ti_{0.2}PO_4$ powder specimen (prepared by processing for 12 hours with a planetary ball mill) of Preparative Example 8.

Comparative Example 9

A positive electrode pellet was produced as in Example 7, but in this case without carrying out the heat treatment for 1 hour at 500° C. in an argon atmosphere after the acetylene black had been mixed with the $LiMn_{0.6}Fe_{0.2}Ti_{0.2}PO_4$ powder specimen (prepared by processing for 12 hours with a planetary ball mill) of Preparative Example 8.

A charge-discharge profile is shown by the dashed line in FIG. 32 for 2.0 to 4.5 V voltage regulation and a 0.1 mA/cm² charge-discharge rate, for a coin cell fabricated as in Example 7 using this comparison positive electrode pellet.

As may be understood from the results in FIG. 32, the argon anneal also provides a substantial improvement in the electroconductivity of the positive electrode in the case of the $LiMn_{0.6}Fe_{0.2}Ti_{0.2}PO_4$ powder specimen prepared by doping with Fe and Ti with processing for 12 hours with a planetary ball mill.

Example 8

Figure 33:
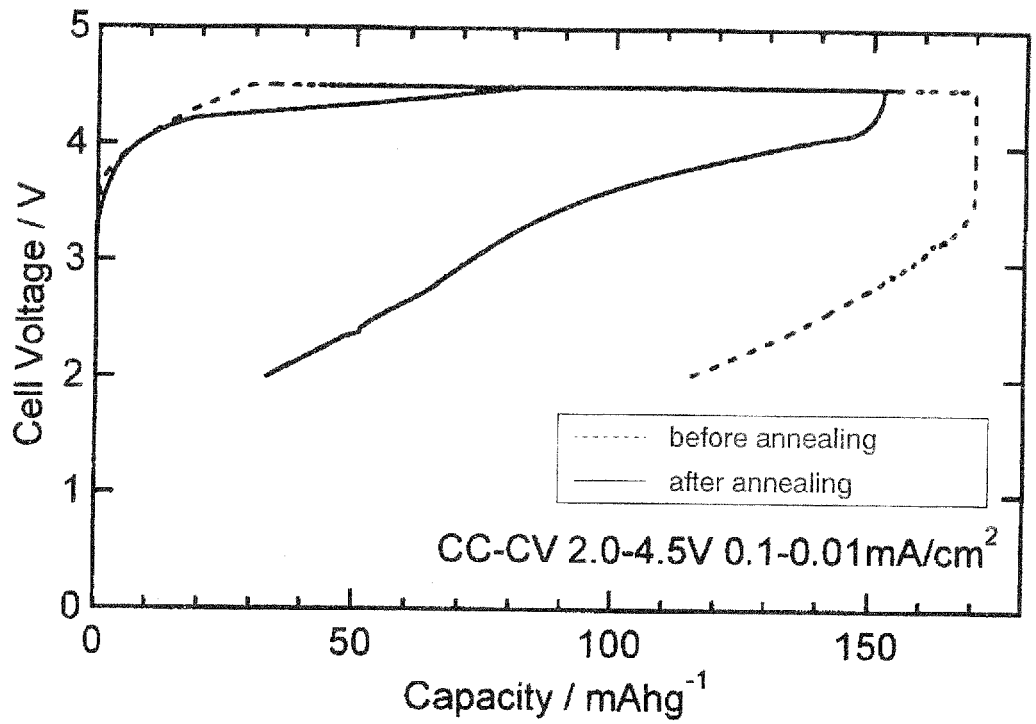
FIG. 33 is a diagram that compares the initial charge-discharge profiles of Example 8 and Comparative Example 10.

Measurement of battery characteristics:

A charge-discharge profile is shown by the solid line in FIG. 33 for 2.0 to 4.5 V CV voltage regulation and a 0.1 mA/cm² charge-discharge rate, for a coin cell fabricated by the method of Production Example 2 using the positive electrode pellet produced by the method of Production Example 1 from the $LiMn_{0.6}CO_{0.2}Ti_{0.2}PO_4$ powder specimen (prepared by processing for 12 hours with a planetary ball mill) of Preparative Example 9.

Comparative Example 10

A positive electrode pellet was produced as in Example 8, but in this case without carrying out the heat treatment for 1 hour at 500° C. in an argon atmosphere after the acetylene black had been mixed with the $LiMn_{0.6}CO_{0.2}Ti_{0.2}PO_4$ powder specimen (prepared by processing for 12 hours with a planetary ball mill) of Preparative Example 9.

A charge-discharge profile is shown by the dashed line in FIG. 33 for 2.0 to 4.5 V voltage regulation and a 0.1 mA/cm² charge-discharge rate, for a coin cell fabricated as in Example 8 using this comparison positive electrode pellet.

As may be understood from the results in FIG. 33, the argon anneal also provides a substantial improvement in the electroconductivity of the positive electrode in the case of the $LiMn_{0.6}CO_{0.2}Ti_{0.2}PO_4$ powder specimen prepared by doping with Co and Ti with processing for 12 hours with a planetary ball mill.

Example 9

Figure 34:
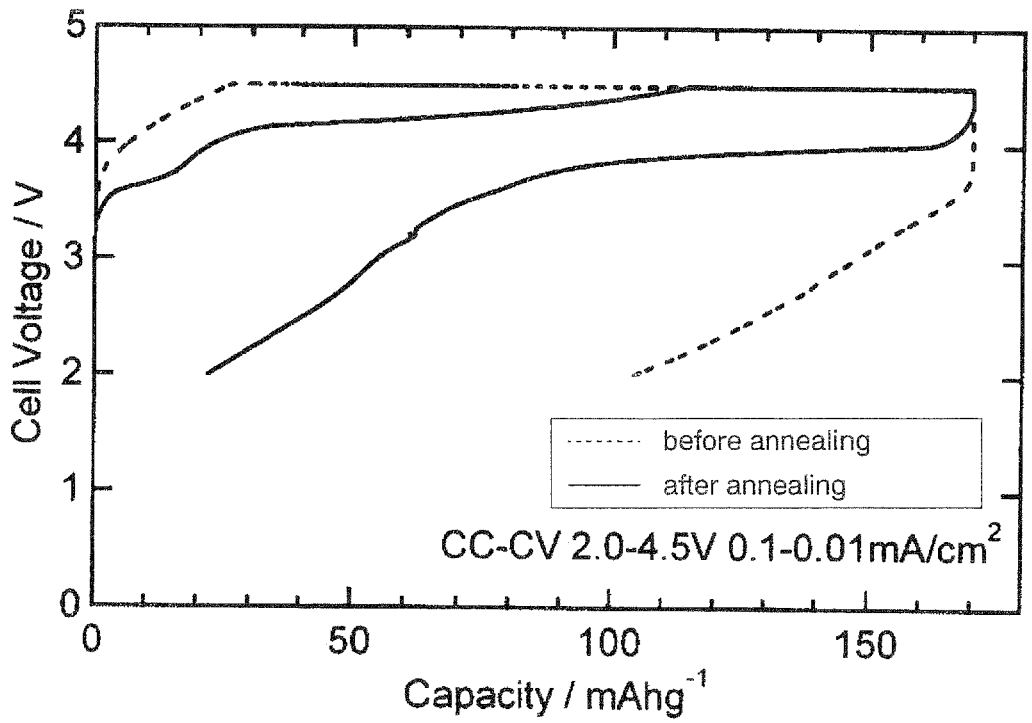
FIG. 34 is a diagram that compares the initial charge-discharge profiles of Example 9 and Comparative Example 11.

Measurement of battery characteristics:

A charge-discharge profile is shown by the solid line in FIG. 34 for 2.0 to 4.5 V CV voltage regulation and a 0.1 mA/cm² charge-discharge rate, for a coin cell fabricated by the method of Production Example 2 using the positive electrode pellet produced by the method of Production Example 1 from the $LiMn_{0.8}Fe_{0.1}Ti_{0.1}PO_4$ powder specimen (prepared by processing for 12 hours with a planetary ball mill) of Preparative Example 10.

Comparative Example 11

A positive electrode pellet was produced as in Example 9, but in this case without carrying out the heat treatment for 1 hour at 500° C. in an argon atmosphere after the acetylene black had been mixed with the $LiMn_{0.8}Fe_{0.1}Ti_{0.1}PO_4$ powder specimen (prepared by processing for 12 hours with a planetary ball mill) of Preparative Example 10.

A charge-discharge profile is shown by the dashed line in FIG. 34 for 2.0 to 4.5 V voltage regulation and a 0.1 mA/cm² charge-discharge rate, for a coin cell fabricated as in Example 9 using this comparison positive electrode pellet.

As may be understood from the results in FIG. 34, the argon anneal also provides a substantial improvement in the electroconductivity of the positive electrode in the case of the $LiMn_{0.8}Fe_{0.1}Ti_{0.1}PO_4$ powder specimen prepared by doping with Fe and Ti with processing for 12 hours with a planetary ball mill.

INDUSTRIAL APPLICABILITY

Nonaqueous electrolyte batteries that utilize the positive electrode active material of the present invention can be exemplified by lithium secondary batteries such as lithium metal batteries, lithium ion batteries, lithium polymer batteries, and so forth. These secondary batteries are useful as rechargeable power sources in particular for electric cars and the like.

The invention claimed is:

1. A method of producing a positive electrode active material, the method comprising:
    preparing lithium manganese phosphate $LiMnPO_4$ or a compound $LiMn_{1-x}M_xPO_4$ wherein $0<x<1$ and M is at least one metal element selected from the group consisting of Co, Ni, Fe, Zn, Cu, Ti, Sn, Zr, V, and Al, containing $LiMnPO_4$ as a solid solution composition using a manganese source containing a manganese powder;
    mixing carbon particles with lithium manganese phosphate $LiMnPO_4$ or the compound $LiMn_{1-x}M_xPO_4$ containing lithium manganese phosphate $LiMnPO_4$ as a solid solution composition, and
    heat treating the obtained mixture under an inert gas atmosphere.

2. The production method according to claim 1, wherein the carbon particles are acetylene black.

3. The production method according to claim 1, wherein said M is at least one metal element selected from the group consisting of Co, Ni, Fe, and Cu.

4. The production method according to claim 1, wherein said M is at least one metal element selected from the group consisting of Ti, Co, and Fe.

5. The production method according to claim 1, wherein said M is Fe.

6. The production method according to claim 1, wherein the method comprising a step of mixing carbon particles with lithium manganese phosphate $LiMnPO_4$, and heat treating the obtained mixture is under an inert gas atmosphere.

7. The production method according to claim 1, wherein said heat treating step is conducted at a temperature of from 400 to 600° C.

8. The production method according to claim 6, wherein said heat treating step is conducted at a temperature of from 400 to 600° C.

9. The production method according to claim 1, wherein the carbon particles are mixed with said lithium manganese phosphate $LiMnPO_4$.

* * * * *